United States Patent
Zhang et al.

(10) Patent No.: US 12,388,507 B2
(45) Date of Patent: Aug. 12, 2025

(54) PHYSICAL UPLINK SHARED CHANNEL (PUSCH) TRANSMISSION BASED ON ROBUST CODEBOOK

(71) Applicant: Apple Inc., Cupertino, CA (US)

(72) Inventors: Yushu Zhang, Beijing (CN); Gang Xiong, Portland, OR (US); Guotong Wang, Beijing (CN); Alexei Davydov, Nizhny Novgorod (RU); Paul C Wei, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/488,328

(22) Filed: Oct. 17, 2023

(65) Prior Publication Data
US 2024/0063874 A1 Feb. 22, 2024

Related U.S. Application Data

(63) Continuation of application No. 16/483,568, filed as application No. PCT/CN2018/097020 on Jul. 25, 2018, now Pat. No. 11,799,533.

(30) Foreign Application Priority Data

Jul. 27, 2017 (WO) ................ PCT/CN2017/094696
Sep. 11, 2017 (WO) ................ PCT/CN2017/101214

(51) Int. Cl.
*H04B 7/06* (2006.01)
*H04B 7/0456* (2017.01)
(Continued)

(52) U.S. Cl.
CPC ......... *H04B 7/0628* (2013.01); *H04B 7/0478* (2013.01); *H04B 7/0486* (2013.01);
(Continued)

(58) Field of Classification Search
CPC .. H04B 7/0478; H04B 7/0486; H04B 7/0639; H04B 15/06; H04L 5/0051;
(Continued)

(56) References Cited

U.S. PATENT DOCUMENTS

2018/0309490 A1* 10/2018 Rahman ............... H04B 7/0478
2020/0083939 A1* 3/2020 Park ..................... H04L 5/0007
(Continued)

*Primary Examiner* — Donald L Mills
(74) *Attorney, Agent, or Firm* — Fay Kaplun & Marcin, LLP

(57) ABSTRACT

The present disclosure provides apparatuses, systems, methods, and machine readable storage medium for physical uplink shared channel (PUSCH) transmission between a user equipment (UE) and a base station, based on a robust codebook. In an embodiment, a UE, including circuitry operable to: report a UE capability of the UE to a base station, wherein the UE capability comprises a number of phase tracking reference signal (PT-RS) antenna ports ($N_{PT\text{-}RS}$) supported by the UE; decode control signaling received from the base station, wherein the control signaling comprises at least one parameter to indicate a precoder selected from a codebook based on at least the $N_{PT\text{-}RS}$; and perform physical uplink shared channel (PUSCH) transmission according to the indicated precoder; wherein the codebook is predefined or configured based on different numbers of PT-RS antenna ports and different waveforms, in the UE and the base station.

18 Claims, 10 Drawing Sheets

(51) Int. Cl.
*H04B 15/06* (2006.01)
*H04L 5/00* (2006.01)
*H04L 25/02* (2006.01)
*H04L 27/26* (2006.01)
*H04W 8/24* (2009.01)
*H04W 72/23* (2023.01)
*H04W 76/27* (2018.01)
*H04W 88/06* (2009.01)
*H04W 88/10* (2009.01)

(52) U.S. Cl.
CPC ........... *H04B 7/0639* (2013.01); *H04B 15/06* (2013.01); *H04L 5/0051* (2013.01); *H04L 25/0226* (2013.01); *H04L 27/2607* (2013.01); *H04L 27/2636* (2013.01); *H04W 8/24* (2013.01); *H04W 72/23* (2023.01); *H04W 76/27* (2018.02); *H04W 88/06* (2013.01); *H04W 88/10* (2013.01); *H04L 5/0048* (2013.01); *H04L 27/2602* (2013.01)

(58) Field of Classification Search
CPC ............. H04L 25/0226; H04L 27/2607; H04L 27/2636; H04W 8/24; H04W 72/23; H04W 76/27; H04W 88/06; H04W 88/10
See application file for complete search history.

(56) References Cited

U.S. PATENT DOCUMENTS

2020/0127786 A1\* 4/2020 Kwak ................. H04B 7/0417
2020/0162133 A1\* 5/2020 Harrison ............. H04W 52/248
2020/0186208 A1\* 6/2020 Molés Cases ....... H04B 7/0456

\* cited by examiner

PHYSICAL UPLINK SHARED CHANNEL (PUSCH) TRANSMISSION BASED ON ROBUST CODEBOOK

CROSS REFERENCES TO RELATED APPLICATIONS

This application is a continuation of U.S. application Ser. No. 16/483,568, filed Aug. 5, 2019, which is a national phase entry under 35 U.S.C. § 371 of International Application No. PCT/CN2018/097020, filed Jul. 25, 2018, entitled "PHYSICAL UPLINK SHARED CHANNEL (PUSCH) TRANSMISSION BASED ON ROBUST CODEBOOK," which claims priority to international application No. PCT/CN2017/094696, entitled "ROBUST UPLINK CODEBOOK BASED TRANSMISSION" and filed on Jul. 27, 2017, and international application No. PCT/CN2017/101214, entitled "ROBUST UPLINK CODEBOOK BASED RANSMISSION" and filed on Sep. 11, 2017, which are hereby incorporated by reference in their entireties.

TECHNICAL FIELD

Embodiments of the present disclosure generally relate to the field of wireless communications, and more particularly, to physical uplink shared channel (PUSCH) transmission between a user equipment (UE) and a base station (e.g., a next generation Node B (gNodeB)), based on a robust codebook.

BACKGROUND

Researches and developments on the fifth generation (5G) communications have attracted interests of both academia and industries recently. It is expected that 5G communication systems could address the massive capacity and massive connectivity challenges brought by exponentially growing mobile traffic and machine type applications. Massive multiple-input-multiple-output (MIMO) systems formed by equipping base stations (BSs) with a large number of transmit antennas at the BSs can serve a large number of users at the same frequency band simultaneously.

In order to serve the massive MIMO systems, the 3rd Generation Partnership Project (3GPP) has adopted codebook based transmission between the base stations and UEs in recent versions of technical specifications (TSs), such as, 3GPP TS 38.211(e.g., version 0.1.0, Jul. 1, 2017), 3GPP TS 38.212 (e.g., version 0.0.0, May 23, 2017), 3GPP TS 38.213 (e.g., version 1.0.0, Sep. 7, 2017), 3GPP TS 38.214 (e.g., version 0.0.2, Aug. 11, 2017), 3GPP TS 38.331(e.g., version 0.0.2, Jun. 16, 2017), and so forth. For codebook based transmission, design of the codebook is of great importance.

BRIEF DESCRIPTION OF THE DRAWINGS

Embodiments will be readily understood by the following detailed description in conjunction with the accompanying drawings. In figures of the accompanying drawings, like reference numerals refer to similar elements.

DETAILED DESCRIPTION

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

The 5G communication systems may work at different frequency bands, including lower bands (<6 GHz) and some millimeter wave (mmWave) bands. For UE communicating with a base station in the mmWave bands, phase noises may result in some common phase errors (CPEs) for all subcarriers in a symbol among transmission antenna ports which share the same oscillator. Different CPEs may be observed from different transmission antenna ports if they use different oscillators or they are located in a relatively large distance.

Figure 1:
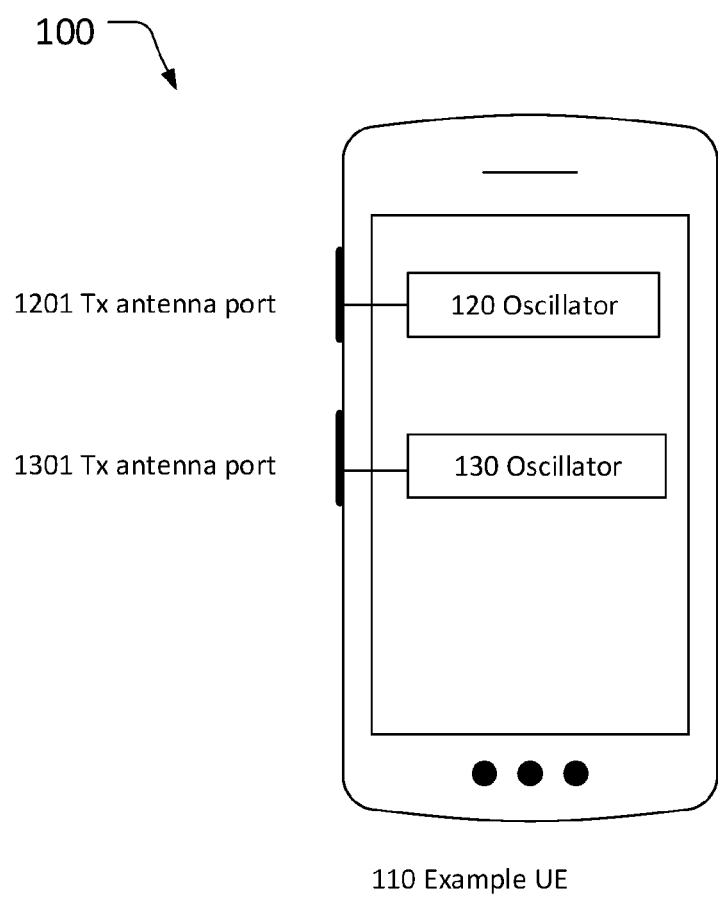
FIG. 1 illustrates an example antenna port configuration of UE in accordance with some embodiments of the disclosure.

FIG. 1 illustrates an example antenna port configuration 100 of UE in accordance with some embodiments of the disclosure. As shown in FIG. 1, the UE 110 has two oscillators 120 and 130. Each of the oscillators 120 and 130 may be engaged with one or more transmission antenna ports. As an example, the oscillator 120 is engaged with a transmission antenna port 1201, and the oscillator 130 is engaged with a transmission antenna port 1301. As a result, different CPEs may be observed from the transmission antenna port 1201 and transmission antenna port 1301. In other embodiments, the oscillators 120 and 130 may be engaged with other numbers of transmission antenna ports, as required by corresponding implementations.

Figure 2:
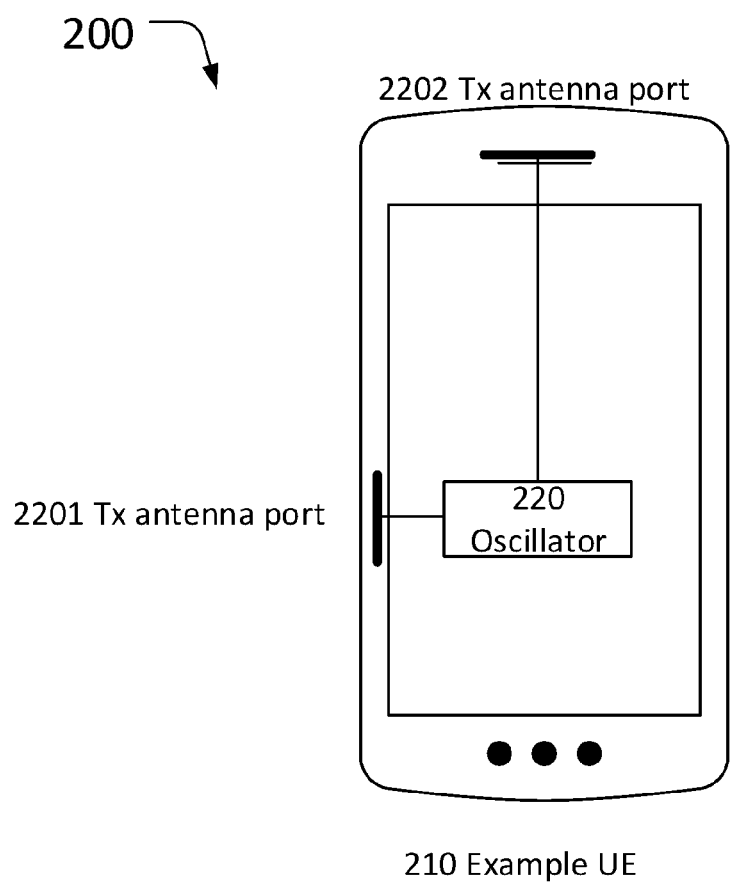
FIG. 2 illustrates another example antenna port configuration of UE in accordance with some embodiments of the disclosure.

FIG. 2 illustrates another example antenna port configuration 200 of UE in accordance with some embodiments of the disclosure. As shown in FIG. 2, the UE 210 has an oscillator 220, which is engaged with two transmission antenna ports 2201 and 2202 installed at different positions on the UE 210. Since the transmission antenna ports 2201 and 2202 are located relatively far from each other, different CPEs may be observed from the transmission antenna port 2201 and transmission antenna port 2202. In other embodiments, the oscillator 220 may be engaged with other numbers of transmission antenna ports, as required by corresponding implementations.

In FIG. 1 and FIG. 2, the UE may include any mobile or non-mobile computing device, such as a smartphone, a personal data assistant (PDA), a tablet, a pager, a laptop computer, a desktop computer, a wireless handset, or any computing device including a wireless communications interface. In cases that the UE has a relatively large volume, for example, the UE is a laptop computer or a desktop computer, the UE may include more oscillators, such as, four or eight oscillators etc.

For the example antenna port configurations as shown in FIG. 1 and FIG. 2, a phase tracking reference signal (PT-RS) is used to compensate the phase noises. Phase offsets between transmission antenna ports is determined by the oscillators themselves, for example, there is a phase offset between the transmission antenna ports 1201 and 1302 configured with different oscillators 120 and 130 in FIG. 1 and there is no phase offset between the transmission antenna ports 2201 and 2202 engaged with the same oscillator 220 in FIG. 2. Therefore, the number of PT-RS antenna ports for each UE may correspond to the number of oscillators of the UE. However, since the phase noises could be different in different transmission antenna ports, there would be a random co-phase between the transmission antenna ports, resulting in difficulty in coherent transmission between the transmission antenna ports.

As another issue, a cyclic prefix-orthogonal frequency division multiplexing (CP-OFDM) waveform or a Discrete Fourier Transform-spread-OFDM (DFT-s-OFDM) waveform may be used by a UE for uplink (UL) transmission, as indicated by a base station communicating with the UE. Different waveforms may also involve different phase noises, which may contribute to the phase noises between different transmission antenna ports of the UE.

Taking different numbers of PT-RS antenna ports and different waveforms to be used by UE for UL transmission, a robust codebook is proposed in the present application.

PUSCH transmission can be dynamically scheduled by an UL grant in downlink control information (DCI) or semi-statically configured upon reception of a higher layer parameter indicating a UL grant configuration. Two transmission schemes are supported for PUSCH: codebook based transmission and non-codebook based transmission. For codebook based transmission, a well-designed codebook may be of great importance in facilitating the communication.

Figure 3:
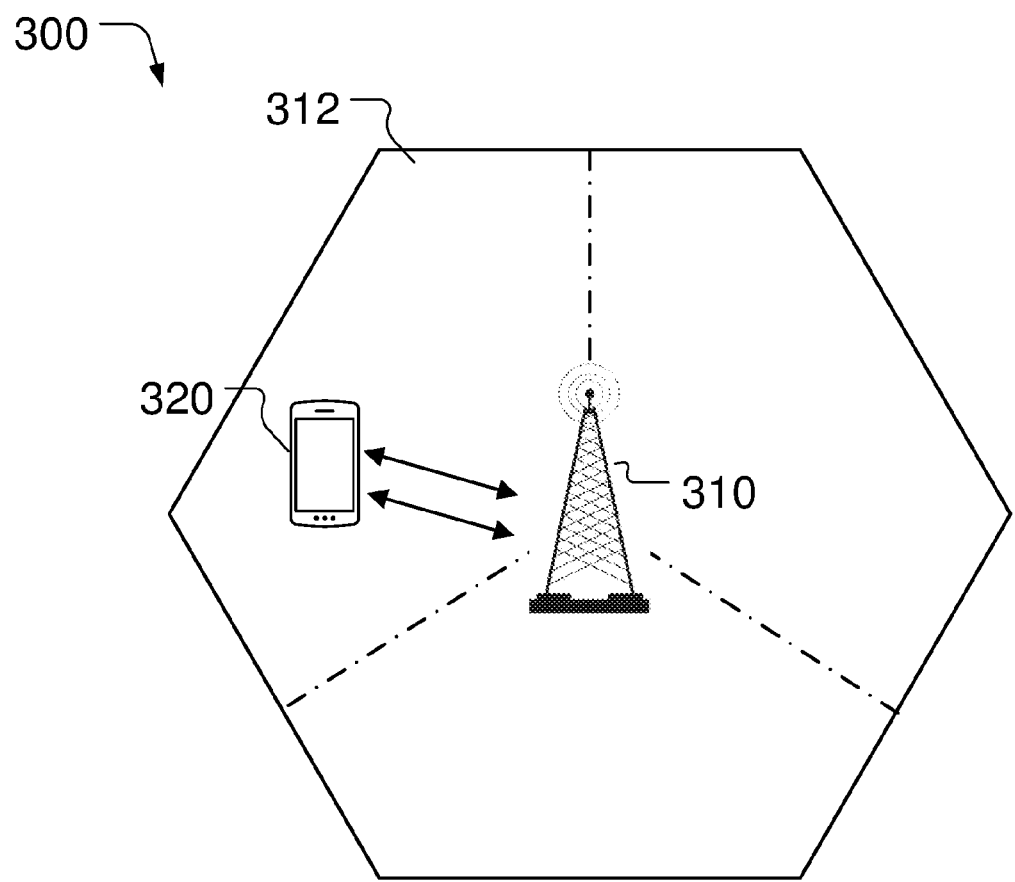
FIG. 3 illustrates a simplified wireless communication system in which embodiments of the disclosure can be implemented.

FIG. 3 illustrates a simplified wireless communication system 300 in which embodiments of the disclosure can be implemented. In some embodiments, the wireless communication system 300 may be applied to implement the 5$^{th}$ generation (5G) wireless network.

In an embodiment, the wireless communication system 300 may include at least a base station 310 and user equipment (UE) 320. The base station 110 may be a next-generation node B (gNodeB/gNB). The base station 310 may be operable over a coverage area 312, which may be regarded as a cell. The UE 120 may communicate with the base station 310 within the coverage area 312. In other embodiments, the wireless communication system 300 may include one or more UE and gNodeBs.

The UE 320 may provide transmission to and receive transmission from the base station 310 at different frequency bands, including lower bands (<6 GHz) and some mmWave bands.

In order to initiate physical uplink shared channel (PUSCH) transmission to the base station 310, the UE 320 may report its UE capability to the base station 310 by Radio Resource Control (RRC) signaling. In an embodiment, the UE capability may include a number of phase tracking reference signal (PT-RS) antenna ports ($N_{PT-RS}$) supported by the UE. The $N_{PT-RS}$ may be determined based on phase noise levels or oscillators of the UE. In another embodiment, the UE capability may include a number of sounding reference signal (SRS) antenna ports ($N_{SRS}$), or a number of SRS antenna ports per PT-RS antenna port. The number of SRS antenna ports per PT-RS antenna port may be used to obtain a number of transmission antenna ports ($N_{Tx}$) per PT-RS antenna port (e.g., N), which means for every N transmission antenna ports, the UE 320 should use 1 PT-RS antenna port. In other embodiments, as required by different embodiments, the UE capability may include different parameters, such as, a codebook supported by the UE, transmission ability of the UE, and so on.

The base station 310 may select a precoder from a codebook, based at least on the UE capability (e.g., the $N_{PT-RS}$), and transmit the precoder to the UE 320, in response to the reception of the UE capability reported by the UE 320. In an embodiment, the base station 310 may select the precoder from a codebook predefined in a technical specification and pre-stored in the base station 310, or configured by higher layer signaling. The same precoder may also be pre-stored and configured in the UE 320. For example, the base station 310 may transmit control signaling to the UE 320, which may include at least one parameter to indicate the selected precoder. In an embodiment, the control signaling may include a UL grant. The UL grant may be transmitted in a downlink control information (DCI) format. In the embodiment, the selected precoder is indicated by a transmission precoder matrix indicator (TPMI) and a transmission rank indicator (TRI) included in the DCI. In another embodiment, the control signaling may include RRC signaling. The RRC signaling may also be included in DCI, which includes a TPMI and a TRI to indicate the selected precoder. In a further embodiment, the control signaling may include the RRC signaling and UL grant. In that case, the RRC signaling may include parameters to indicate a selection of antenna ports to be used by the UE 320 for UL transmission, for example, a subset of the codebook. The UL grant may be transmitted in a DCI format, and include a TPMI and a TRI to indicate the selected precoder.

In an embodiment, the base station 310 may also transmit to the UE 320 a waveform configuration for the UE 320 to use for the UL transmission in the control signaling. In another embodiment, the base station 310 may just indicate the waveform configuration by the precoder, rather than sending the waveform configuration explicitly in the control signaling. The waveform configuration is one of a cyclic prefix-orthogonal frequency division multiplexing (CP-OFDM) waveform and a Discrete Fourier Transform-spread-OFDM (DFT-s-OFDM) waveform.

Upon receiving the precoder, the UE 320 may determine a number of PT-RS antenna ports selected by the base station 310 and to be used by the UE 320 for the PUSCH transmission. In another embodiment, the UE 320 may determine the waveform to be used for the PUSCH transmission according to the control signaling, no matter whether it is explicitly or implicitly indicated by the control signaling. The UE 320 may then perform the PUSCH transmission based on the precoder and the waveform.

As indicated above, the codebook may be predefined or configured in both the base station 310 and the UE 320. In an embodiment, the codebook may be defined as include a rank 1 codebook, a rank 2 codebook, or a high rank codebook (the high rank is represented by R which is an integer larger than 2).

For example, the rank 1 codebook is represented by Equation (1):

$$w^{(1)}_{m,n,g,k} = \frac{1}{\sqrt{N}} [v_{m,g,k} \; \varphi_n v_{m,g,k}]^T \quad \text{Equation (1)}$$

where N is the number of transmission antenna ports per PT-RS antenna port and is denoted as $$N = \left\lfloor \frac{N_{Tx}}{N_{PT-RS}} \right\rfloor,$$

$N_{Tx}$ is the number of transmission antenna ports, and $N_{PT-RS}$ is the number of PT-RS antenna ports;

$$\varphi_n = e^{j\pi n/2};$$

$$v_{m,g,k} = \left(\left[1 \; e^{\frac{j2\pi m}{N_{Tx}}} \; e^{\frac{j4\pi m}{N_{Tx}}} \; \ldots \; e^{\frac{j2\pi m(\lfloor N/2 \rfloor + k)}{N_{Tx}}} \; 0 \; \ldots \; 0\right]\right)_g,$$

m is an antenna combining offset, n is an antenna co-phasing phase offset, g is a number of selected antenna ports, $g=aN$, $a=0,1,\ldots,N_{PT-RS}$, $k=0$ or 1, and $(X)_g$ means that a vector X is rotated right by g elements.

For example, the rank 2 codebook is represented by Equation (2):

$$w^{(2)}_{m,n,g,k} = \frac{1}{\sqrt{2N}} \begin{bmatrix} v_{m,g,k} & v_{m',g',k'} \\ \varphi_n v_{m,g,k} & -\varphi_n v_{m',g',k'} \end{bmatrix} \quad \text{Equation (2)}$$

where N has the same meaning as in Equation (1);

$$\varphi_n = e^{j\pi n/2};$$

$$v_{m,g,k} = \left(\left[1 \; e^{\frac{j2\pi m}{N_{Tx}}} \; e^{\frac{j4\pi m}{N_{Tx}}} \; \ldots \; e^{\frac{j2\pi m(\lfloor N/2 \rfloor + k)}{N_{Tx}}} \; 0 \; \ldots \; 0\right]\right)_g,$$

and $v_{m',g',k'} = \left(\left[1 \; e^{\frac{j2\pi m'}{N_{Tx}}} \; e^{\frac{j4\pi m'}{N_{Tx}}} \; \ldots \; e^{\frac{j2\pi m'(\lfloor N/2 \rfloor + k')}{N_{Tx}}} \; 0 \; \ldots \; 0\right]\right)_{g'},$ where m is an antenna combining offset for a first layer (a column of a matrix is defined as a "layer" herein, for example, the first layer means the first column of the matrix in Equation (2)), n is an antenna co-phasing phase offset, g is a number of selected antenna ports for the first layer, $g=aN$, $a=0,1,\ldots,N_{PT-RS}$, $k=0$ or 1, m' is an antenna combining offset for a second layer, g' is a number of selected antenna ports for the second layer, $g'=a'N$, $a'=0,1,\ldots,N_{PT-RS}$, $k'=0$ or 1, and $(X)_g$ means that a vector X is rotated right by g elements.

For example, the high rank codebook is represented by Equation (3):

$$w^{(R)}_{m,n,g,k} = \frac{1}{\sqrt{RN}} \begin{bmatrix} v_{m_0,g_0,k_0} & \cdots & v_{m_{R/2},g_{R/2},k_{R/2}} & v_{m_0,g_0,k_0} & \cdots & v_{m_{R/2},g_{R/2},k_{R/2}} \\ \varphi_n v_{m_0,g_0,k_0} & \cdots & \varphi_n v_{m_{R/2},g_{R/2},k_{R/2}} & -\varphi_n v_{m_0,g_0,k_0} & \cdots & -\varphi_n v_{m_{R/2},g_{R/2},k_{R/2}} \end{bmatrix} \quad \text{Equation (3)}$$

where N has the same meaning as in Equations (1) and (2);

$$\varphi_n = e^{j\pi n/2};$$

$$v_{m_0,g_0,k_0} = \left(\left[1 \; e^{\frac{j2\pi m_0}{N_{Tx}}} \; e^{\frac{j4\pi m_0}{N_{Tx}}} \; \ldots \; e^{\frac{j2\pi m_0(\lfloor N/2 \rfloor + k_0)}{N_{Tx}}} \; 0 \; \ldots \; 0\right]\right)_{g_0},$$

and $v_{m_{R/2},g_{R/2},k_{R/2}} =$ $$\left(\left[1 \; e^{\frac{j2\pi m_{R/2}}{N_{Tx}}} \; e^{\frac{j4\pi m_{R/2}}{N_{Tx}}} \; \ldots \; e^{\frac{j2\pi m_{R/2}(\lfloor N/2 \rfloor + k_{R/2})}{N_{Tx}}} \; 0 \; \ldots \; 0\right]\right)_{g_{R/2}},$$

where m is an antenna combining offset, n is an antenna co-phasing phase offset, g is a number of selected antenna ports, $g=aN$, $a=0,1,\ldots,N_{PT-RS}$, $k=0$ or 1, and the subscripts $0,\ldots,R/2$ of m, g and k indicate that the corresponding parameters m, g and k are for corresponding layers, for example, $m_{R/2}$, $g_{R/2}$ and $k_{R/2}$ are parameters corresponding to a R/2 layer, $M_{R/2}$ is an antenna combining offset for the R/2 layer, $g_{R/2}$ is a number of selected antenna ports for the R/2 layer, $k_{R/2}=0$ or 1, and $(X)_g$ means that a vector X is rotated right by g elements.

As an example, Table 1 shows a codebook for a case that the number of transmission antenna ports is 2 and the number of PT-RS antenna ports is also 2

$$\left(\text{i.e., } N = \left\lfloor \frac{N_{Tx}}{N_{PT-RS}} \right\rfloor = 1\right),$$

according to the above Equations (1)-(3).

TABLE 1

Example codebook for a case of $N = \left\lfloor \frac{N_{Tx}}{N_{PT-RS}} \right\rfloor = \left\lfloor \frac{2}{2} \right\rfloor = 1$

| Codebook Index | Rank 1 Codebook | Rank 2 Codebook |
|---|---|---|
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | — |

In Table 1, a number of the codebook indices is related to different configurations of the parameters m, n, g and k in the Equations (1)-(3).

In another embodiment, the codebook may support both a selection of antenna ports and a combination of the selected antenna ports. In that case, the codebook may be defined in a two-stage manner. For the example, the codebook matrix (W) may be represented by:

$$W = W_1 W_2 \quad \text{Equation (4)}$$

where $W_1$ is used for selecting antenna ports, and $W_2$ is used for indicating co-phasing between the selected antenna ports.

In the embodiment, for wideband precoding, precoders within the codebook may be indicated by a TPMI based on W. Further, for subband precoding, precoders within the codebook may be indicated by a first TPMI (TPMI1) based on $W^1$ and a second TPMI (TPMI2) based on $W_2$. For example, the first TPMI may be used to indicate a wideband antenna port selection and the second TPMI is used to indicate antenna co-phasing for each subband.

For example, in a case that the number of transmission antenna ports ($N_{Tx}$) is 4 and the number of PT-RS antenna ports ($N_{PT-RS}$) is 2, $W_1$ may be given as shown in Table 2.

TABLE 2

$W_1$ in a case of $N_{Tx} = 4$ and $N_{PT-RS} = 2$

| TPMI1 Index | 0 | 1 | 2 | 3 | 4 | 5 | 6 |
|---|---|---|---|---|---|---|---|
| Precoder | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1 & 0\\0 & 1\\0 & 0\\0 & 0\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0 & 0 & 0\\0 & 1 & 0 & 0\\0 & 0 & 1 & 0\\0 & 0 & 0 & 1\end{bmatrix}$ |

In that case, as an example, when TPMI1=4 or 5, $W_2$ may be based on a codebook as defined in 3GPP long term evolution (LTE) release 10 for CP-OFDM and/or DFT-s-OFDM waveforms in a case of $N_{Tx}$=2; when TPMI1=6, $W_2$ may be based on the codebook as defined in 3GPP LTE for CP-OFDM and/or DFT-s-OFDM waveforms in a case of $N_{Tx}$=4; and when TPMI1=1-3, $W_2$ may be 1.

In another embodiment, the codebook, as predefined or configured in both the base station 310 and UE 320, may be divided into a plurality of codebook subsets based on different numbers of PT-RS antenna ports and/or different waveforms.

Table 3 shows an example of codebook subsets divided based on different numbers of PT-RS antenna ports ($N_{PT-RS}$) and different waveforms, when the number of transmission antenna ports is $N_{Tx}$.

TABLE 3

Example codebook subsets

| Codebook Subset | Use Case |
|---|---|
| 0 | CP-OFDM waveform, $N_{PT-RS} = 1$ |
| ... | ... |
| $N_{Tx}-1$ | CP-OFDM waveform, $N_{PT-RS} = N_{Tx}$ |
| $N_{Tx}$ | DFT-s-OFDM waveform, $N_{PT-RS} = 1$ |
| ... | ... |
| $2N_{Tx}-1$ | DFT-s-OFDM waveform, $N_{PT-RS} = N_{Tx}$ |

The codebook subsets may be configured by higher layer signaling or DCI, or may be determined by the waveform for corresponding data channel transmission and/or the number of PT-RS antenna ports. By selecting a codebook subset firstly by the base station 310 and informing the UE 320 of the selected subset, when indicating the precoder in the DCI, the payload size for indicating the precoder with TPMI and TRI may be reduced.

In a further embodiment, the codebook may be divided into a plurality of codebook subsets based only on different numbers of PT-RS antenna ports, since the waveform may be dynamically changed. Therefore, different waveforms, i.e., the CP-OFDM waveform and DFT-s-OFDM waveform, may have the same codebook subsets divided according to $N_{PT-RS}$.

Table 4 shows an example of codebook subsets divided based only on different $N_{PT-RS}$, when the number of transmission antenna ports is $N_{Tx}$.

TABLE 4

Example codebook subsets

| Codebook Subset | Use Case |
|---|---|
| 0 | Both CP-OFDM and DFT-s-OFDM waveform, $N_{PT-RS} = 1$ |
| ... | ... |
| $N_{Tx}-1$ | Both CP-OFDM and DFT-s-OFDM waveform, $N_{PT-RS} = N_{Tx}$ |

In that case, as mentioned above, the base station 310 may code jointly an indication for the waveform for the UE 320 with the indication for the precoder (e.g., the TPMI and TRI) in the DCI. Alternatively, the waveform for the UE 320 may be implicitly indicated by the TPMI and TRI. In that case, precoders corresponding to each waveform may be predefined. For example, when TRI>1, CP-OFDM waveform will be used by the UE 320 for UL transmission, if the DFT-s-OFDM waveform can only be sued for rank 1 transmission.

In other embodiments, the codebook may be divided based on other factors, as required by the embodiments, which is not limited in the respect of the description.

In the embodiments where the codebook is divided into several codebook subsets, in response to the reception of the UE capability, the base station 310 may select a codebook subset from the codebook subsets based on the $N_{PT-RS}$ included in the UE capability and/or a waveform configuration for the UE 320. The base station 310 may then send an indication of the selected codebook subset to the UE 320. The base station 310 may also send an indication of the waveform configuration jointly with the indication of the selected codebook subset to the UE 320. Alternatively, waveform configuration may be implicitly indicated by the indication of the selected codebook subset.

In the embodiments, the base station 310 may then select the precoder from the codebook subset and transmit the precoder to the UE 320 in control signaling, for example, the DCI. In that case, when indicating the precoder in the DCI, the payload size for indicating the precoder with the TPMI and TRI may be reduced, as compared with selecting the precoder directly from the whole codebook and indicating the precoder by the TPMI and TRI.

The UE 320 may then perform PUSCH transmission based on the precoder and waveform configuration, irrespective of approaches or steps for obtaining the precoder and waveform configuration.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1.

Figure 4:
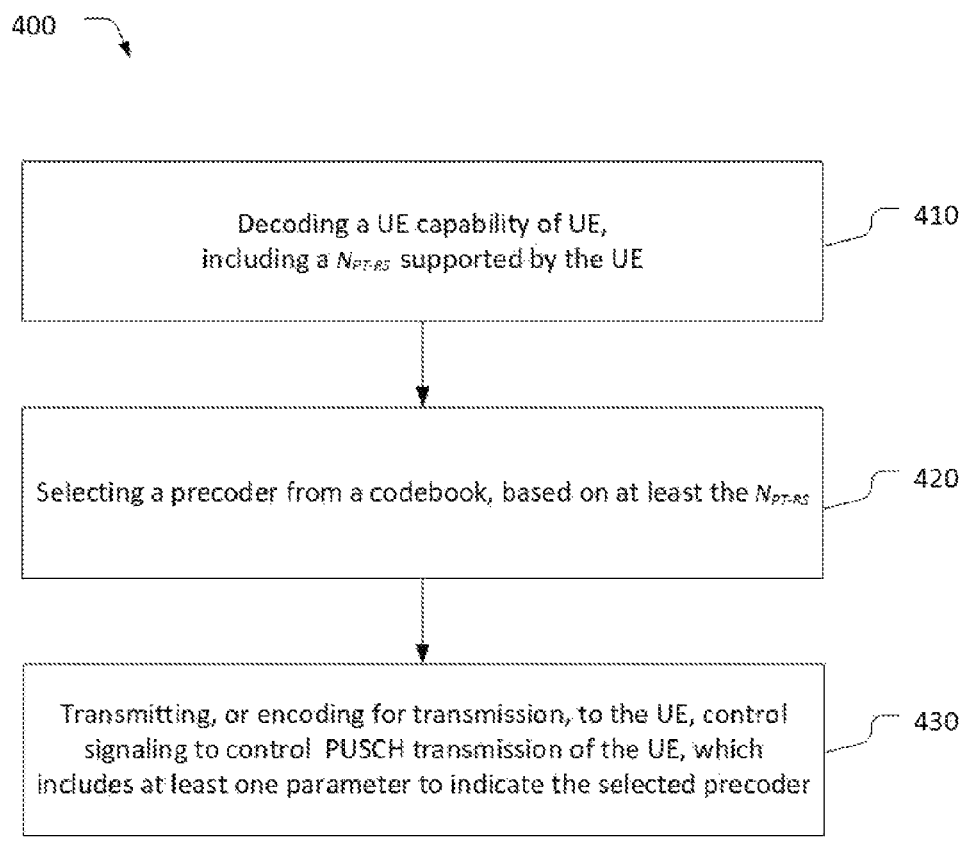
FIG. 4 illustrates is a flow chart of a method for PUSCH transmission between a UE and a gNodeB, in accordance with various embodiments of the disclosure.

Referring to FIG. 4, illustrated is a flow chart of a method 400 for PUSCH transmission between a UE and a gNodeB, in accordance with various embodiments of the disclosure. In some aspects, the method 400 can be performed by the base station 310 (gNodeB) of FIG. 3. In other aspects, a machine readable storage medium may store instructions associated with method 400, which when executed can cause a gNodeB to perform the method 400.

The method 400 may include, at 410, decoding a UE capability of the UE (e.g., the UE 320 of FIG. 3) reported by the UE. For example, the UE capability may include a number of PT-RS antenna ports ($N_{PT-RS}$) supported by the UE. For another example, the UE capability may include a number of SRS antenna ports ($N_{SRS}$), or a number of SRS antenna ports per PT-RS antenna port.

The method 400 may include, at 420, selecting a precoder from a codebook, based on at least the $N_{PT-RS}$. The codebook may be predefined in a corresponding technical specification and pre-stored in the gNodeB and UE. Alternatively, the codebook may be configured by higher layer signaling.

The method 400 may further include, at 430, transmitting or encoding for transmission, to the UE, control signaling to control the PUSCH transmission of the UE, which includes at least one parameter to indicate the selected precoder. In an embodiment, the control signaling may include a UL grant. The UL grant may be transmitted in a DCI format. In the embodiment, the selected precoder is indicated by a TPMI and a TRI included in the DCI. In another embodiment, the control signaling may include RRC signaling. The RRC signaling may also be included in DCI, which includes a TPMI and a TRI to indicate the selected precoder. In a further embodiment, the control signaling may include the RRC signaling and UL grant. In that case, the RRC signaling may include parameters to indicate a selection of antenna ports to be used by the UE for UL transmission, for example, a codebook subset. The UL grant may be transmitted in a DCI format, and include a TPMI and a TRI to indicate the selected precoder. The control signaling may also include parameters to indicate a waveform configuration for the UE to use for the PUSCH transmission. Alternatively, the waveform configuration may be implicitly indicated by the selected precoder. The waveform configuration may be one of a CP-OFDM waveform and DFT-s-OFDM waveform.

Figure 5:
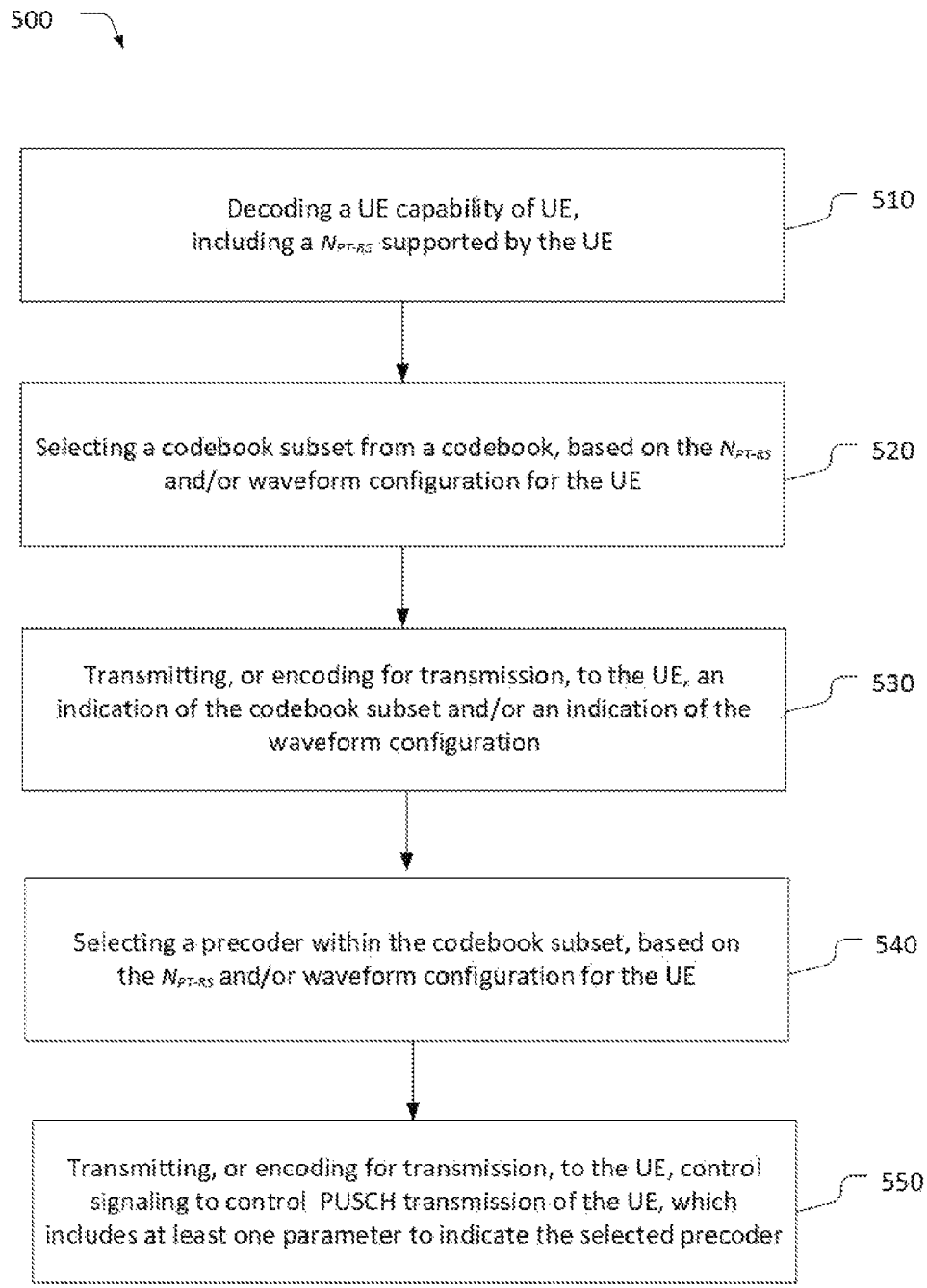
FIG. 5 illustrates is a flow chart of another method for PUSCH transmission between a UE and a gNodeB, in accordance with various embodiments of the disclosure.

Referring to FIG. 5, illustrated is a flow chart of a method 500 for PUSCH transmission between a UE and a gNodeB, in accordance with various embodiments of the disclosure. In some aspects, the method 500 can be performed by the base station 310 (gNodeB) of FIG. 3. In other aspects, a machine readable storage medium may store instructions associated with method 500, which when executed can cause a gNodeB to perform the method 500.

The method 500 may include, at 510, decoding a UE capability of the UE (e.g., the UE 320 of FIG. 3) reported by the UE. For example, the UE capability may include a number of PT-RS antenna ports ($N_{PT-RS}$) supported by the UE. For another example, the UE capability may include a number of SRS antenna ports ($N_{SRS}$), or a number of SRS antenna ports per PT-RS antenna port.

The method 500 may include, at 520, selecting a codebook subset from a codebook, based on the $N_{PT-RS}$ and/or waveform configuration for the UE. The codebook may be predefined in a corresponding technical specification and pre-stored in the gNodeB and UE. Alternatively, the codebook may be configured by higher layer signaling. The codebook may be divided into codebook subsets by higher layer signaling or DCI. Alternatively, the codebook subsets may be determined by the waveform for corresponding data channel transmission and/or the number of PT-RS antenna ports. The waveform configuration is one of a CP-OFDM waveform and DFT-s-OFDM waveform.

The method 500 may further include, at 530, transmitting, or encoding for transmission, to the UE, an indication of the codebook subset and/or an indication of the waveform configuration. In an embodiment, the indication of the codebook subset and the indication of the waveform configuration may be transmitted jointly by RRC signaling. In another embodiment, the waveform configuration may be implicitly indicated by the codebook subset.

The method 500 may further include, at 540, selecting a precoder within the codebook subset, based on the $N_{PT-RS}$ and/or waveform configuration for the UE.

The method 500 may further include, at 550, transmitting, or encoding for transmission, to the UE, control signaling to control the PUSCH transmission of the UE, which includes at least one parameter to indicate the selected precoder. The control signaling may include a UL grant and/or RRC signaling. For example, the control signaling may be transmitted in DCI, which includes a TPMI and a TRI to indicate the selected precoder.

Figure 6:
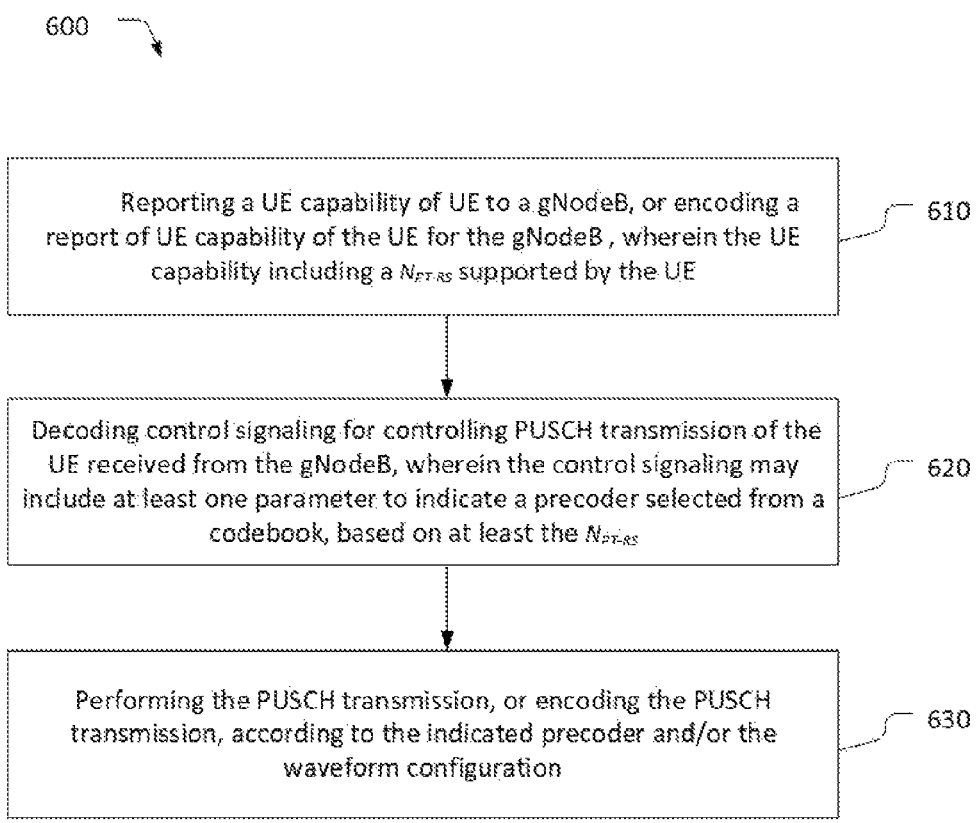
FIG. 6 illustrates is a flow chart of another method for PUSCH transmission between a UE and a gNodeB, in accordance with various embodiments of the disclosure.

Referring to FIG. 6, illustrated is a flow chart of a method 600 for PUSCH transmission between a UE and a gNodeB, in accordance with various embodiments of the disclosure. In some aspects, the method 600 can be performed by the UE 320 of FIG. 3. In other aspects, a machine readable storage medium may store instructions associated with method 600, which when executed can cause a UE to perform the method 600.

The method 600 may include, at 610, reporting a UE capability of the UE (e.g., the UE 320 of FIG. 3) to the gNodeB (e.g., the gNodeB 310 of FIG. 3), or encoding a report of UE capability of the UE for the gNodeB. For example, the UE capability may include a number of PT-RS antenna ports ($N_{PT\text{-}RS}$) supported by the UE. For another example, the UE capability may include a number of SRS antenna ports ($N_{SRS}$), or a number of SRS antenna ports per PT-RS antenna port.

The method 600 may include, at 620, decoding control signaling for controlling PUSCH transmission of the UE, received from the gNodeB. The control signaling may include at least one parameter to indicate a precoder selected from a codebook based on at least the $N_{PT\text{-}RS}$. The codebook may be predefined in a corresponding technical specification and pre-stored in the gNodeB and UE. Alternatively, the codebook may be configured by higher layer signaling.

In an embodiment, the control signaling may include a UL grant. The UL grant may be transmitted in a DCI format. In the embodiment, the selected precoder is indicated by a TPMI and a TRI included in the DCI. In another embodiment, the control signaling may include RRC signaling. The RRC signaling may also be included in DCI, which includes a TPMI and a TRI to indicate the selected precoder. In a further embodiment, the control signaling may include the RRC signaling and UL grant. In that case, the RRC signaling may include parameters to indicate a selection of antenna ports to be used by the UE for the PUSCH transmission, for example, a codebook subset. The UL grant may be transmitted in a DCI format, and include a TPMI and a TRI to indicate the selected precoder. The control signaling may also include parameters to indicate a waveform configuration for the UE to use for the PUSCH transmission. Alternatively, the waveform configuration may be implicitly indicated by the selected precoder. The waveform configuration may be one of a CP-OFDM waveform and DFT-s-OFDM waveform.

The method 600 may further include, at 630, performing the PUSCH transmission, or encoding the PUSCH transmission, according to the indicated precoder and/or the waveform configuration.

Figure 7:
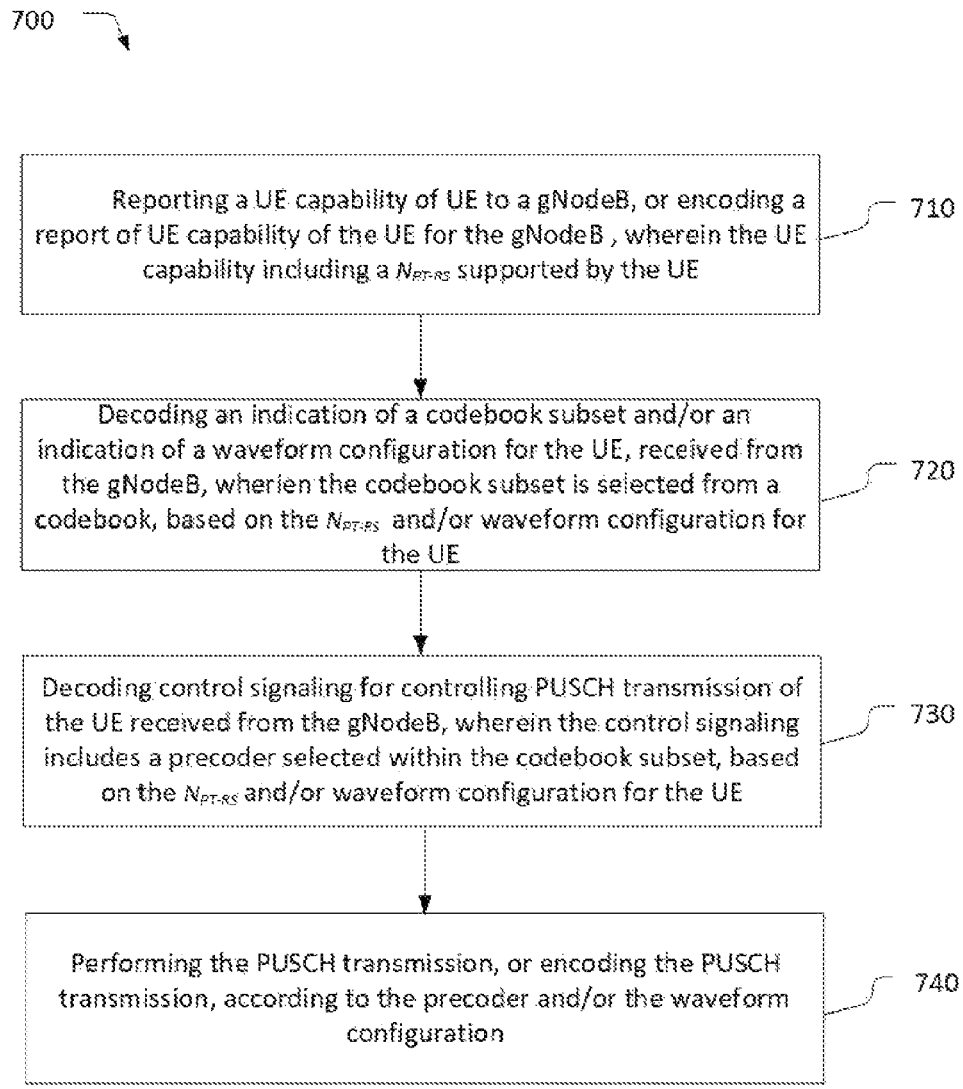
FIG. 7 illustrates is a flow chart of another method for PUSCH transmission between a UE and a gNodeB, in accordance with various embodiments of the disclosure.

Referring to FIG. 7, illustrated is a flow chart of a method 700 for PUSCH transmission between a UE and a gNodeB, in accordance with various embodiments of the disclosure. In some aspects, the method 700 can be performed by the UE 320 of FIG. 3. In other aspects, a machine readable storage medium may store instructions associated with method 700, which when executed can cause a gNodeB to perform the method 700.

The method 700 may include, at 710, reporting, a UE capability of the UE (e.g., the UE 320 of FIG. 3) to the gNodeB (e.g., the gNodeB 310 of FIG. 3), or encoding a report of UE capability of the UE for the gNodeB. For example, the UE capability may include a number of PT-RS antenna ports ($N_{PT\text{-}RS}$) supported by the UE. For another example, the UE capability may include a number of SRS antenna ports ($N_{SRS}$), or a number of SRS antenna ports per PT-RS antenna port.

The method 700 may include, at 720, decoding an indication of a codebook subset and/or an indication of a waveform configuration for the UE, received from the gNodeB. The codebook subset is selected from a codebook, based on the $N_{PT\text{-}RS}$ and/or waveform configuration for the UE. The codebook may be predefined in a corresponding technical specification and pre-stored in the gNodeB and UE. Alternatively, the codebook may be configured by higher layer signaling. The codebook may be divided into codebook subsets by higher layer signaling or DCI. Alternatively, the codebook subsets may be determined by the waveform for corresponding data channel transmission and/or the number of PT-RS antenna ports. The waveform configuration is one of a CP-OFDM waveform and DFT-s-OFDM waveform. In an embodiment, the indication of the codebook subset and the indication of the waveform configuration may be transmitted jointly by RRC signaling. In another embodiment, the waveform configuration may be implicitly indicated by the codebook subset.

The method 700 may further include, at 730, decoding control signaling for controlling PUSCH transmission of the UE, received from the gNodeB. The control signaling may include at least one parameter to indicate a precoder selected within the codebook subset, based on the $N_{PT\text{-}RS}$ and/or waveform configuration for the UE. The control signaling may include a UL grant and/or RRC signaling. For example, the control signaling may be transmitted in DCI, which includes a TPMI and a TRI to indicate the selected precoder.

The method 700 may further include, at 740, performing the PUSCH transmission, or encoding the PUSCH transmission, according to the precoder and/or the waveform configuration.

Figure 8:
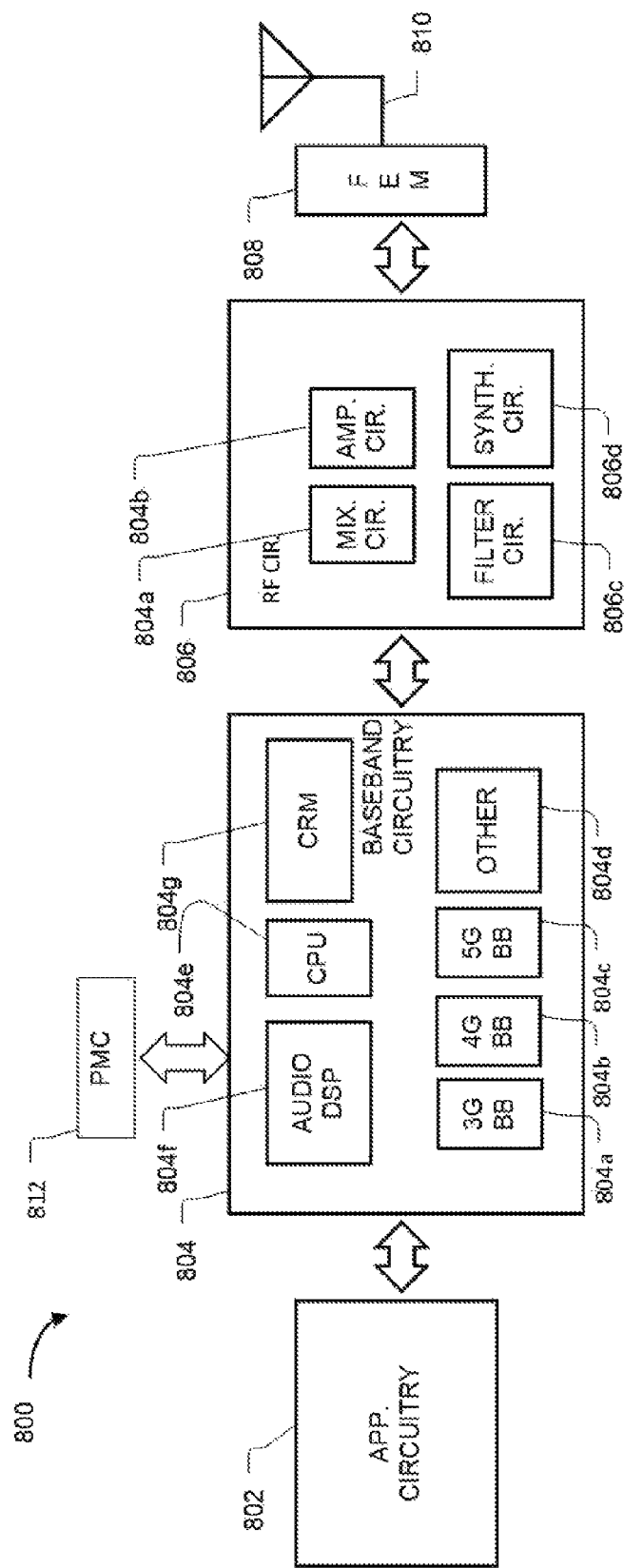
FIG. 8 illustrates an electronic device in accordance with some embodiments of the disclosure.

Embodiments described herein may be implemented into a system using any suitably configured hardware and/or software. FIG. 8 illustrates, for an embodiment, example components of an electronic device 800. In embodiments, the electronic device 800 may be, implement, be incorporated into, or otherwise be a part of the base station 310 or UE 320 of FIG. 3, or some other electronic devices. In some embodiments, the electronic device 800 may include application circuitry 802, baseband circuitry 804, Radio Frequency (RF) circuitry 806, front-end module (FEM) circuitry 808 and one or more antennas 810, and power management circuitry (PMC) 812, coupled together at least as shown.

The application circuitry 802 may include one or more application processors. For example, the application circuitry 802 may include circuitry such as, but not limited to, one or more single-core or multi-core processors or processing circuitry. The processor(s) may include any combination of general-purpose processors and dedicated processors (for example, graphics processors, application processors, etc.). The processor(s)/processing circuitry may be coupled with or may include memory/storage and may be configured to execute instructions stored in the memory/storage to enable various applications or operating systems to run on the system.

The baseband circuitry 804 may include circuitry such as, but not limited to, one or more single-core or multi-core processors, to perform the various two element RA procedures described herein. In an embodiment, in case that the electronic device 800 is used as a UE, for example, the baseband circuitry 804 may be used to perform the method 600 or method 700 as shown in the flowcharts of FIG. 6 or FIG. 7. In another embodiment, in case that the electronic device 800 is used as a base station (e.g., a gNodeB/gNB), for example, the baseband circuitry 804 may be used to perform the method 400 or method 500 as shown in the flowcharts of FIG. 4 or FIG. 5.

The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include third generation (3G) baseband processor 804*a*, fourth generation (4G) baseband processor 804*b*, a fifth generation (5G) baseband processor 804*c*, or other baseband processor(s) 804*d* for other existing generations, generations in development, or to be developed in the future (for example, 6G, etc.).

The baseband circuitry 804 (for example, one or more of baseband processors 804*a-d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an EUTRAN protocol including, for example, PHY, MAC, RLC, PDCP, or RRC elements. A central processing unit (CPU) 804*e* of the baseband circuitry 804 may be configured to run elements of the protocol stack for signaling of the PHY, MAC, RLC, PDCP, or RRC layers.

In some embodiments, the baseband circuitry may include one or more audio digital signal processor(s) (DSP) 804*f*. The audio DSP(s) 804*f* may be include elements for compression/decompression and echo cancellation and may include other suitable processing elements in other embodiments.

The baseband circuitry 804 may further include memory/storage 804*g*. The memory/storage 804*g* may be used to load and store data or instructions for operations performed by the processors of the baseband circuitry 804. Memory/storage for one embodiment may include any combination of suitable volatile memory or non-volatile memory. The memory/storage 804*g* may include any combination of various levels of memory/storage including, but not limited to, read-only memory (ROM) having embedded software instructions (for example, firmware), random access memory (for example, dynamic random access memory (DRAM)), cache, buffers, etc. The memory/storage 804*g* may be shared among the various processors or dedicated to particular processors. In an embodiment, in case that the electronic device 800 is used as a UE, for example, the memory/storage 804*g* may be used to store a codebook and/or UL data to be transmitted to a base station, for example. In another embodiment, in case that the electronic device 800 is used as a base station (e.g., a gNodeB/gNB), for example, the memory/storage 804*g* may be used to store a codebook and/or DL data to be transmitted to a UE.

Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with a RAN, for example, an EUTRAN or next generation RAN (NG RAN), or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806*a*, amplifier circuitry 806*b* and filter circuitry 806*c*. The transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature down-conversion or up-conversion respectively. In some embodiments, the mixer circuitry 806*a* of the receive signal path and the mixer circuitry 806*a* of the transmit signal path may include two or more mixers and may be arranged for image rejection (for example, Hartley image rejection). In some embodiments, the mixer circuitry 806a of the receive signal path and the mixer circuitry 806a may be arranged for direct down-conversion or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (for example, N) may be determined from a look-up table based on a channel indicated by the application circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (for example, to the RF circuitry 806). The transmit signal path of the FEM circuitry 108 may include a power amplifier (PA) to amplify input RF signals (for example, provided by RF circuitry 806), and one or more filters to generate RF signals for subsequent transmission (for example, by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the electronic device 800 may include additional elements such as, for example, memory/storage, display, camera, sensor, or input/output (I/O) interface.

In some embodiments, the electronic device 800 of FIG. 8 may be configured to perform one or more processes, techniques, or methods as described herein, or portions thereof. For example, the electronic device 800 may perform operations described in FIGS. 4-7.

Figure 9:
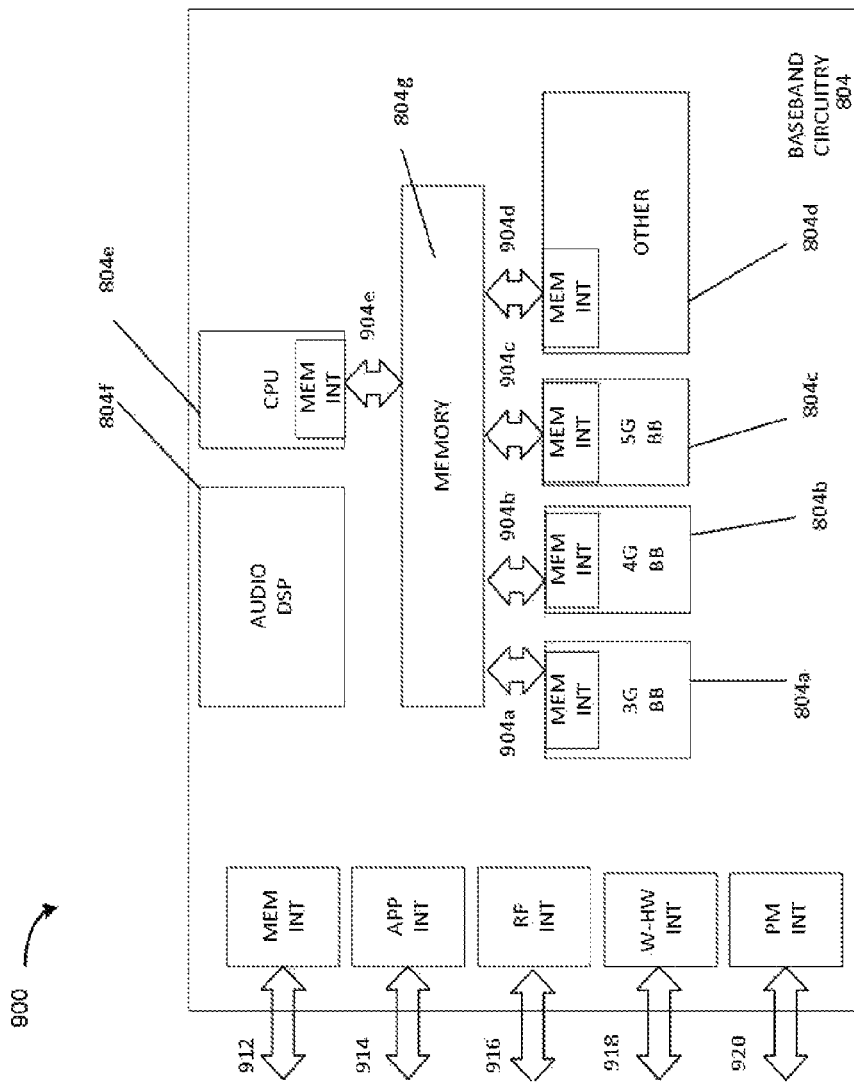
FIG. 9 illustrates example interfaces of baseband circuitry in accordance with some embodiments of the disclosure.

FIG. 9 illustrates example interfaces of baseband circuitry in accordance with some embodiments. As discussed above, the baseband circuitry 804 of FIG. 8 may comprise processors 804a-d and a memory 804g utilized by said processors. Each of the processors 804a-d may include a memory interface, 904a-d, respectively, to send/receive data to/from the memory 804g.

The baseband circuitry 804 may further include one or more interfaces to communicatively couple to other circuitry/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
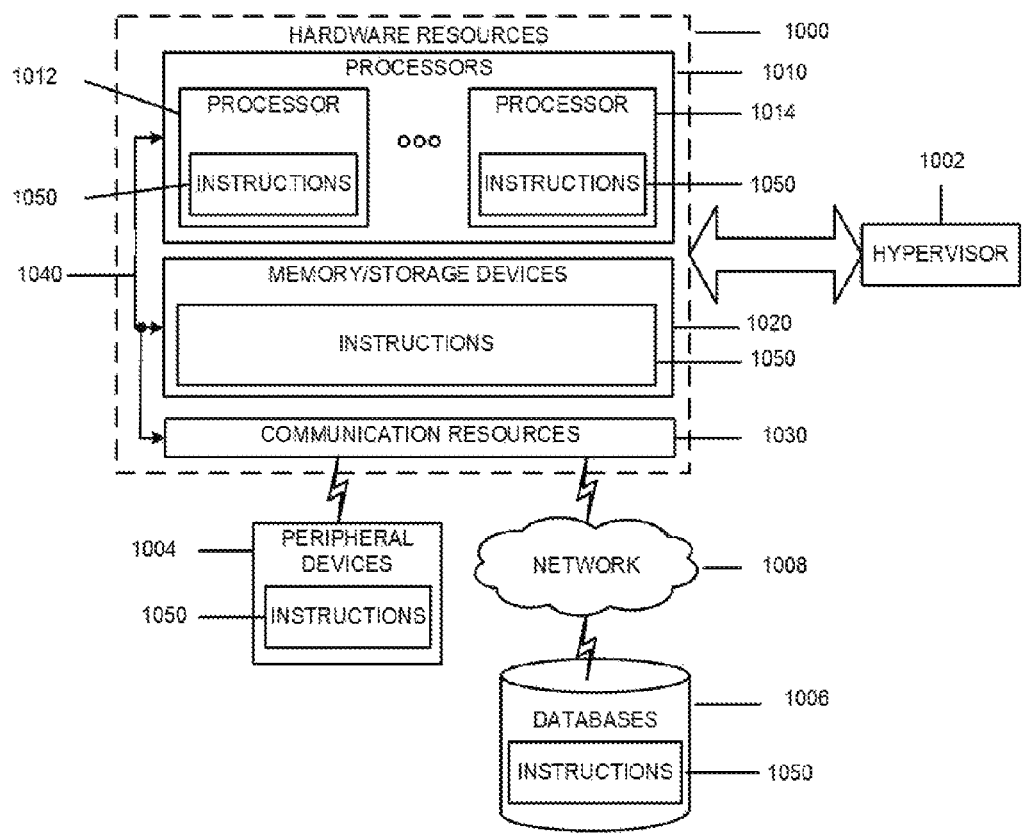
FIG. 10 illustrates hardware resources in accordance with some embodiments of the disclosure.

FIG. 10 is a block diagram illustrating components, according to some example embodiments, able to read instructions from a machine-readable or computer-readable medium (for example, a machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (for example, network function virtualization (NFV)) is utilized, a hypervisor 1002 may be executed to provide an execution environment for one or more network slices/sub-slices to utilize the hardware resources 1000.

The processors 1010 (for example, a CPU, a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (for example, for coupling via a Universal Serial Bus (USB)), cellular communication components, near-field communication (NFC) components, Bluetooth® components (for example, Bluetooth® Low Energy), Wi-Fi® components, and other communication components.

Instructions 1050 may include software, a program, an application, an applet, an app, or other executable code for causing at least any of the processors 1010 to perform any one or more of the methodologies discussed herein.

In embodiments in which the hardware resources 1000 are incorporated into the UE 320, the instructions 1050 may cause the processors 1010 to perform the methods 600 and 700 as shown in the flow charts of FIG. 6-7.

In embodiments in which the hardware resources 1000 are incorporated into the base station 310, the instructions 1050 may cause the processors 1010 to perform the methods 400 and 500 as shown in the flow charts of FIG. 4-5.

The instructions 1050 may reside, completely or partially, within at least one of the processors 1010 (for example, within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

The resources described in FIG. 10 may also be referred to as circuitry. For example, communication resources 1030 may also be referred to as communication circuitry 1030.

Some non-limiting examples are provided below.

Example 1 includes a user equipment (UE), comprising circuitry operable to: report a UE capability of the UE to a next generation Node B (gNodeB), wherein the UE capability comprises a number of phase tracking reference signal (PT-RS) antenna ports ($N_{PT\text{-}RS}$) supported by the UE; decode control signaling received from the gNodeB, wherein the control signaling comprises at least one parameter to indicate a precoder selected from a codebook based on at least the $N_{PT\text{-}RS}$; and perform physical uplink shared channel (PUSCH) transmission according to the indicated precoder; wherein the codebook is predefined or configured based on different numbers of PT-RS antenna ports and different waveforms, in the UE and the gNodeB.

Example 2 includes the UE of example 1, wherein the circuitry is further operable to determine a number of PT-RS antenna ports to be used for the PUSCH transmission, based on the indicated precoder.

Example 3 includes the UE of examples 1 or 2, wherein the control signaling comprises an uplink (UL) grant and/or Radio Resource Control (RRC) signaling.

Example 4 includes the UE of any of examples 1-3, wherein the control signaling is received in downlink control information (DCI) transmitted from the gNodeB, and the precoder is indicated by a transmission precoder matrix indicator (TPMI) and a transmission rank indicator (TRI) included in the DCI.

Example 5 includes the UE of any of examples 1-4, wherein the circuitry is further operable to: decode a waveform configuration for the UE received in the control signaling; or determine the waveform configuration based on the indicated precoder; wherein the waveform configuration is one of a cyclic prefix-orthogonal frequency division mulplexing (CP-OFDM) waveform and a Discrete Fourier Transform-spread-OFDM (DFT-s-OFDM) waveform.

Example 6 includes the UE of any of examples 1-5, wherein the predefined or configured codebook in the UE and the gNodeB is divided into a plurality of codebook subsets based on different numbers of PT-RS antenna ports and/or different waveforms.

Example 7 includes the UE of example 6, wherein the circuitry is further operable to: decode an indication of a codebook subset received from the gNodeB, wherein the codebook subset is selected by the gNodeB based on the $N_{PT\text{-}RS}$ and/or a waveform configuration for the UE, wherein the indicated precoder is within the codebook subset; wherein the waveform configuration is one of a cyclic prefix-orthogonal frequency division mulplexing (CP-OFDM) waveform and a Discrete Fourier Transform-spread-OFDM (DFT-s-OFDM) waveform.

Example 8 includes the UE of example 7, wherein the circuitry is further operable to: decode an indication of the waveform configuration received from the gNodeB; or determine the waveform configuration based on the codebook subset.

Example 9 includes the UE of any of examples 1-8, wherein the UE capability further comprises a number of Sounding reference signal (SRS) antenna ports ($N_{SRS}$), or a number of SRS antenna ports per PT-RS antenna port.

Example 10 includes the UE of example 9, wherein the codebook comprises a rank 1 codebook, which is denoted as:

$$w^{(1)}_{m,n,g,k} = \frac{1}{\sqrt{N}} [v_{m,g,k} \varphi_n v_{m,g,k}]^T$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and wherein $$\varphi_n = e^{j\pi n/2};$$

$$v_{m,g,k} = \left( \left[ 1 \quad e^{\frac{j2\pi m}{N_{Tx}}} \quad e^{\frac{j4\pi m}{N_{Tx}}} \quad \ldots \quad e^{\frac{j2\pi m(\lfloor N/2 \rfloor + k)}{N_{Tx}}} \quad 0 \quad \ldots \quad 0 \right] \right)_g,$$

m is an antenna combining offset, n is an antenna co-phasing phase offset, g is a number of selected antenna ports, g=aN, a=0,1, . . . , $N_{PT-RS}$, k=0 or 1, and $(X)_g$ means that a vector X is rotated right by g elements.

Example 11 includes the UE of example 9, wherein the codebook comprises a rank 2 codebook, which is denoted as:

$$w^{(2)}_{m,n,g,k} = \frac{1}{\sqrt{2N}} \begin{bmatrix} v_{m,g,k} & v_{m',g',k'} \\ \varphi_n v_{m,g,k} & -\varphi_n v_{m',g',k'} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2};$$

$$v_{m,g,k} = \left( \left[ 1 \quad e^{\frac{j2\pi m}{N_{Tx}}} \quad e^{\frac{j4\pi m}{N_{Tx}}} \quad \ldots \quad e^{\frac{j2\pi m(\lfloor N/2 \rfloor + k)}{N_{Tx}}} \quad 0 \quad \ldots \quad 0 \right] \right)_g,$$

and $v_{m',g',k'} = \left( \left[ 1 \quad e^{\frac{j2\pi m'}{N_{Tx}}} \quad e^{\frac{j4\pi m'}{N_{Tx}}} \quad \ldots \quad e^{\frac{j2\pi m'(\lfloor N/2 \rfloor + k')}{N_{Tx}}} \quad 0 \quad \ldots \quad 0 \right] \right)_{g'},$ m is an antenna combining offset for a first layer, n is an antenna co-phasing phase offset, g is a number of selected antenna ports for the first layer, g=aN, a=0,1, . . . , $N_{PT-RS}$, k=0 or 1, m' is an antenna combining offset for a second layer, g' is a number of selected antenna ports for the second layer, g'=a'N, a'=0,1, . . . , $N_{PT-RS}$, k'=0 or 1, and $(X)_g$ means that a vector X is rotated right by g elements.

Example 12 includes the UE of example 9, wherein the codebook comprises a high rank codebook, wherein the high rank is represented by R which is an integer larger than 2, and the high rank codebook is denoted as:

$$w^{(R)}_{m,n,g,k} = \frac{1}{\sqrt{RN}}$$

$$\begin{bmatrix} v_{m_0,g_0,k_0} & \ldots & v_{m_{R/2},g_{R/2},k_{R/2}} & v_{m_0,g_0,k_0} & \ldots & v_{m_{R/2},g_{R/2},k_{R/2}} \\ \varphi_n v_{m_0,g_0,k_0} & \ldots & \varphi_n v_{m_{R/2},g_{R/2},k_{R/2}} & -\varphi_n v_{m_0,g_0,k_0} & \ldots & -\varphi_n v_{m_{R/2},g_{R/2},k_{R/2}} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2},$$

$$v_{m_0,g_0,k_0} = \left( \left[ 1 \quad e^{\frac{j2\pi m_0}{N_{Tx}}} \quad e^{\frac{j4\pi m_0}{N_{Tx}}} \quad \ldots \quad e^{\frac{j2\pi m_0(\lfloor N/2 \rfloor + k_0)}{N_{Tx}}} \quad 0 \quad \ldots \quad 0 \right] \right)_{g_0},$$

$$v_{m_{R/2},g_{R/2},k_{R/2}} =$$

$$\left( \left[ 1 \quad e^{\frac{j2\pi m_{R/2}}{N_{Tx}}} \quad e^{\frac{j4\pi m_{R/2}}{N_{Tx}}} \quad \ldots \quad e^{\frac{j2\pi m_{R/2}(\lfloor N/2 \rfloor + k_{R/2})}{N_{Tx}}} \quad 0 \quad \ldots \quad 0 \right] \right)_{g_{R/2}},$$

m is an antenna combining offset, n is an antenna co-phasing phase offset, g is a number of selected antenna ports, g=aN, a=0,1, . . . , $N_{PT-RS}$, k=0 or 1, and the subscripts 0, . . . , R/2 of m, g and k indicate that the corresponding parameters m, g and k are for corresponding layers 0, . . . , R/2, and $(X)_g$ means that a vector X is rotated right by g elements.

Example 13 includes the UE of any of examples 1-12, wherein the codebook is capable of supporting antenna combining and antenna selection, and is denoted as:

$$W = W_1 W_2$$

wherein $W_1$ is used for selecting antenna ports, and $W_2$ is used for indicating co-phasing between the selected antenna ports.

Example 14 includes the UE of example 13, wherein for wideband precoding, the precoder is indicated by a transmission precoder matrix indicator (TPMI) based on W; and for subband precoding, the precoder is indicated by a first TPMI based on $W_1$ and a second TPMI based on $W_2$, and wherein the first TPMI is used to indicate a wideband antenna port selection and the second TPMI is used to indicate antenna co-phasing for each subband.

Example 15 includes a base station, comprising circuitry operable to: decode a UE capability of a user equipment (UE) reported by the UE, wherein the UE capability comprises a number of phase tracking reference signal (PT-RS) antenna ports ($N_{PT-RS}$) supported by the UE; select a precoder from a codebook, based on at least the $N_{PT-RS}$; and transmit, to the UE, control signaling to control physical uplink shared channel (PUSCH) transmission of the UE, wherein the control signaling comprises at least one parameter to indicate the selected precoder; wherein the codebook is predefined or configured based on different numbers of PT-RS antenna ports and different waveforms, in the base station and the UE.

Example 16 includes the base station of example 15, wherein the selected precoder indicates a number of PT-RS antenna ports to be used by the UE for the PUSCH transmission.

Example 17 includes the base station of examples 15 or 16, wherein the control signaling comprises an uplink (UL) grant and/or Radio Resource Control (RRC) signaling.

Example 18 includes the base station of any of claims 15-17, wherein the circuitry is operable to transmit the control signaling in downlink control information (DCI), and indicate the selected precoder via a transmission precoder matrix indicator (TPMI) and a transmission rank indicator (TRI) included in the DCI.

Example 19 includes the base station of any of claims 15-18, wherein the circuitry is further operable to: transmit, to the UE, a waveform configuration for the UE, in the control signaling; or indicate the waveform configuration by the selected precoder; wherein the waveform configuration is one of a cyclic prefix-orthogonal frequency division mulplexing (CP-OFDM) waveform and a Discrete Fourier Transform-spread-OFDM (DFT-s-OFDM) waveform.

Example 20 includes the base station of any of claims 15-19, wherein the predefined or configured codebook in the base station and the UE is divided into a plurality of codebook subsets based on different numbers of PT-RS antenna ports and/or different waveforms.

Example 21 includes the base station of claim 20, wherein the circuitry is further operable to: select a codebook subset within the codebook based on the $N_{PT-RS}$ and/or waveform configuration for the UE; transmit, to the UE, an indication of the codebook subset; and selecting the precoder from the codebook subset; wherein the waveform configuration is one of a cyclic prefix-orthogonal frequency division mulplexing (CP-OFDM) waveform and a Discrete Fourier Transform-spread-OFDM (DFT-s-OFDM) waveform.

Example 22 includes the base station of claim 21, wherein the circuitry is operable to: transmit, the waveform configuration, together with the indication of the codebook subset, to the UE; or indicate the waveform configuration by the codebook subset.

Example 23 includes the base station of any of claims 15-22, wherein the UE capability further comprises a number of Sounding reference signal (SRS) antenna ports ($N_{SRS}$), or a number of SRS antenna ports per PT-RS antenna port.

Example 24 includes the base station of example 23, wherein the codebook comprises a rank 1 codebook, which is denoted as:

$$w^{(1)}_{m,n,g,k} = \frac{1}{\sqrt{N}} [v_{m,g,k} \varphi_n v_{m,g,k}]^T$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and wherein $$\varphi_n = e^{j\pi n/2},$$

$$v_{m,g,k} = \left(\left[1 \quad e^{\frac{j2\pi m}{N_{Tx}}} \quad e^{\frac{j4\pi m}{N_{Tx}}} \quad \ldots \quad e^{\frac{j2\pi m(\lfloor N/2 \rfloor+k)}{N_{Tx}}} \quad 0 \ldots 0\right]\right)_g,$$

m is an antenna combining offset, n is an antenna co-phasing phase offset, g is a number of selected antenna ports, g=aN, a=0,1, ..., $N_{PT-RS}$, k=0 or 1, and $(X)_g$ means that a vector X is rotated right by g elements.

Example 25 includes the base station of example 23, wherein the codebook comprises a rank 2 codebook, which is denoted as:

$$w^{(2)}_{m,n,g,k} = \frac{1}{\sqrt{2N}} \begin{bmatrix} v_{m,g,k} & v_{m',g',k'} \\ \varphi_n v_{m,g,k} & -\varphi_n v_{m',g',k'} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2},$$

$$v_{m,g,k} = \left(\left[1 \quad e^{\frac{j2\pi m}{N_{Tx}}} \quad e^{\frac{j4\pi m}{N_{Tx}}} \quad \ldots \quad e^{\frac{j2\pi m(\lfloor N/2 \rfloor+k)}{N_{Tx}}} \quad 0 \ldots 0\right]\right)_g,$$

$$v_{m',g',k'} = \left(\left[1 \quad e^{\frac{j2\pi m'}{N_{Tx}}} \quad e^{\frac{j4\pi m'}{N_{Tx}}} \quad \ldots \quad e^{\frac{j2\pi m'(\lfloor N/2 \rfloor+k')}{N_{Tx}}} \quad 0 \ldots 0\right]\right)_g,$$

m is an antenna combining offset for a first layer, n is an antenna co-phasing phase offset, g is a number of selected antenna ports for the first layer, g=aN, a=0,1, ..., $N_{PT-RS}$, k=0 or 1, m' is an antenna combining offset for a second layer, g' is a number of selected antenna ports for the second layer, g'=a'N, a'=0,1, ..., $N_{PT-RS}$, k'=0 or 1, and $(X)_g$ means that a vector X is rotated right by g elements.

Example 26 includes the base station of example 23, wherein the codebook comprises a high rank codebook, wherein the high rank is represented by R which is an integer larger than 2, and the high rank codebook is denoted as:

$$w^{(R)}_{m,n,g,k} = \frac{1}{\sqrt{RN}}$$

$$\begin{bmatrix} v_{m_0,g_0,k_0} & \cdots & v_{m_{R/2},g_{R/2},k_{R/2}} & v_{m_0,g_0,k_0} & \cdots & v_{m_{R/2},g_{R/2},k_{R/2}} \\ \varphi_n v_{m_0,g_0,k_0} & \cdots & \varphi_n v_{m_{R/2},g_{R/2},k_{R/2}} & -\varphi_n v_{m_0,g_0,k_0} & \cdots & -\varphi_n v_{m_{R/2},g_{R/2},k_{R/2}} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2},$$

$$v_{m_0,g_0,k_0} = \left(\left[1 \quad e^{\frac{j2\pi m_0}{N_{Tx}}} \quad e^{\frac{j4\pi m_0}{N_{Tx}}} \quad \ldots \quad e^{\frac{j2\pi m_0(\lfloor N/2 \rfloor+k_0)}{N_{Tx}}} \quad 0 \ldots 0\right]\right)_{g_0},$$

-continued $$v_{m_{R/2},g_{R/2},k_{R/2}} = \left(\left[1 \quad e^{\frac{j2\pi m_{R/2}}{N_{Tx}}} \quad e^{\frac{j4\pi m_{R/2}}{N_{Tx}}} \quad \ldots \quad e^{\frac{j2\pi m_{R/2}(\lfloor N/2 \rfloor + k_{R/2})}{N_{Tx}}} \quad 0 \ldots 0\right]\right)_{g_{R/2}},$$

m is an antenna combining offset, n is an antenna co-phasing phase offset, g is a number of selected antenna ports, g=aN, a=0,1, ..., $N_{PT-RS}$, k=0 or 1, and the subscripts 0, ..., R/2 of m, g and k indicate that the corresponding parameters m, g and k are for corresponding layers 0, ..., R/2, and $(X)_g$ means that a vector X is rotated right by g elements.

Example 27 includes the base station of any of examples 15-26, wherein the codebook is capable of supporting antenna combining and antenna selection, and is denoted as:

$$W=W_1W_2$$

wherein $W_1$ is used for selecting antenna ports, and $W_2$ is used for indicating co-phasing between the selected antenna ports.

Example 28 includes the base station of example 27, wherein for wideband precoding, the precoder is indicated by a transmission precoder matrix indicator (TPMI) based on W; and for subband precoding, the precoder is indicated by a first TPMI based on $W_1$ and a second TPMI based on $W_2$, and wherein the first TPMI is used to indicate a wideband antenna port selection and the second TPMI is used to indicate antenna co-phasing for each subband.

Example 29 includes a method for physical uplink shared channel (PUSCH) transmission performed by a user equipment (UE), comprising: reporting a UE capability of the UE to a next generation Node B (gNodeB), wherein the UE capability comprises a number of phase tracking reference signal (PT-RS) antenna ports ($N_{PT-RS}$) supported by the UE; decoding control signaling received from the gNodeB, wherein the control signaling comprises at least one parameter to indicate a precoder selected from a codebook based on at least the $N_{PT-RS}$; and performing the PUSCH transmission according to the indicated precoder; wherein the codebook is predefined or configured based on different numbers of PT-RS antenna ports and different waveforms, in the UE and the gNodeB.

Example 30 includes the method of example 29, wherein the method further comprises: determining a number of PT-RS antenna ports to be used for the PUSCH transmission, based on the indicated precoder.

Example 31 includes the method of examples 29 or 30, wherein the control signaling comprises an uplink (UL) grant and/or Radio Resource Control (RRC) signaling.

Example 32 includes the method of any of examples 29-31, wherein the control signaling is received in downlink control information (DCI) transmitted from the gNodeB, and the precoder is indicated by a transmission precoder matrix indicator (TPMI) and a transmission rank indicator (TRI) included in the DCI.

Example 33 includes the method of any of examples 29-32, wherein the method further comprises: decoding a waveform configuration for the UE received in the control signaling; or determining the waveform configuration based on the indicated precoder; wherein the waveform configuration is one of a cyclic prefix-orthogonal frequency division multiplexing (CP-OFDM) waveform and a Discrete Fourier Transform-spread-OFDM (DFT-s-OFDM) waveform.

Example 34 includes the method of any of examples 29-33, wherein the predefined or configured codebook in the UE and the gNodeB is divided into a plurality of codebook subsets based on different numbers of PT-RS antenna ports and/or different waveforms.

Example 35 includes the method of example 34, wherein the method further comprises: decoding an indication of a codebook subset received from the gNodeB, wherein the codebook subset is selected by the gNodeB based on the $N_{PT-RS}$ and/or a waveform configuration for the UE, wherein the indicated precoder is within the codebook subset; wherein the waveform configuration is one of a cyclic prefix-orthogonal frequency division multiplexing (CP-OFDM) waveform and a Discrete Fourier Transform-spread-OFDM (DFT-s-OFDM) waveform.

Example 36 includes the method of example 35, wherein the method further comprises: decoding an indication of the waveform configuration received from the gNodeB; or determining the waveform configuration based on the codebook subset.

Example 37 includes the method of any of examples 29-36, wherein the UE capability further comprises a number of Sounding reference signal (SRS) antenna ports ($N_{SRS}$), or a number of SRS antenna ports per PT-RS antenna port.

Example 38 includes the method of example 37, wherein the codebook comprises a rank 1 codebook, which is denoted as:

$$w^{(1)}_{m,n,g,k} = \frac{1}{\sqrt{N}} [v_{m,g,k} \varphi_n v_{m,g,k}]^T$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and wherein $$\varphi_n = e^{j\pi n/2},$$

$$v_{m,g,k} = \left(\left[1 \quad e^{\frac{j2\pi m}{N_{Tx}}} \quad e^{\frac{j4\pi m}{N_{Tx}}} \quad \ldots \quad e^{\frac{j2\pi m(\lfloor N/2 \rfloor + k)}{N_{Tx}}} \quad 0 \ldots 0\right]\right)_g,$$

m is an antenna combining offset, n is an antenna co-phasing phase offset, g is a number of selected antenna ports, g=aN, a=0,1, ..., $N_{PT-RS}$, k=0 or 1, and $(X)_g$ means that a vector X is rotated right by g elements.

Example 39 includes the method of example 37, wherein the codebook comprises a rank 2 codebook, which is denoted as:

$$w^{(2)}_{m,n,g,k} = \frac{1}{\sqrt{2N}} \begin{bmatrix} v_{m,g,k} & v_{m',g',k'} \\ \varphi_n v_{m,g,k} & -\varphi_n v_{m',g',k'} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2}, v_{m,g,k} = \left( \left[ 1 \ e^{\frac{j2\pi m}{N_{Tx}}} \ e^{\frac{j4\pi m}{N_{Tx}}} \ \ldots \ e^{\frac{j2\pi m(\lfloor N/2 \rfloor + k)}{N_{Tx}}} \ 0 \ldots 0 \right] \right)_g, v_{m',g',k'} =$$

$$\left( \left[ 1 \ e^{\frac{j2\pi m'}{N_{Tx}}} \ e^{\frac{j4\pi m'}{N_{Tx}}} \ \ldots \ e^{\frac{j2\pi m'\left(\lfloor \frac{N}{2} \rfloor + k'\right)}{N_{Tx}}} \ 0 \ldots 0 \right] \right)_g,$$

m is an antenna combining offset for a first layer, n is an antenna co-phasing phase offset, g is a number of selected antenna ports for the first layer, g=aN, a=0,1, ..., $N_{PT-RS}$, k=0 or 1, m' is an antenna combining offset for a second layer, g' is a number of selected antenna ports for the second layer, g=a'N, a'=0,1, ..., $N_{PT-RS}$, k'=0 or 1, and $(X)_g$ means that a vector X is rotated right by g elements.

Example 40 includes the method of example 37, wherein the codebook comprises a high rank codebook, wherein the high rank is represented by R which is an integer larger than 2, and the high rank codebook is denoted as:

$$w^{(R)}_{m,n,g,k} = \frac{1}{\sqrt{RN}} \begin{bmatrix} v_{m_0,g_0,k_0} & \cdots & v_{m_{R/2},g_{R/2},k_{R/2}} & v_{m_0,g_0,k_0} & \cdots & v_{m_{R/2},g_{R/2},k_{R/2}} \\ \varphi_n v_{m_0,g_0,k_0} & \cdots & \varphi_n v_{m_{R/2},g_{R/2},k_{R/2}} & -\varphi_n v_{m_0,g_0,k_0} & \cdots & -\varphi_n v_{m_{R/2},g_{R/2},k_{R/2}} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2}, v_{m_0,g_0,k_0} =$$

$$\left( \left[ 1 \ e^{\frac{j2\pi m_0}{N_{Tx}}} \ e^{\frac{j4\pi m_0}{N_{Tx}}} \ \ldots \ e^{\frac{j2\pi m_0(\lfloor N/2 \rfloor + k_0)}{N_{Tx}}} \ 0 \ldots 0 \right] \right)_{g_0}, v_{m_{R/2},g_{R/2},k_{R/2}} =$$

$$\left( \left[ 1 \ e^{\frac{j2\pi m_{R/2}}{N_{Tx}}} \ e^{\frac{j4\pi m_{R/2}}{N_{Tx}}} \ \ldots \ e^{\frac{j2\pi m_{R/2}(\lfloor N/2 \rfloor + k_{R/2})}{N_{Tx}}} \ 0 \ldots 0 \right] \right)_{g_{R/2}},$$

m is an antenna combining offset, n is an antenna co-phasing phase offset, g is a number of selected antenna ports, g=aN, a=0,1, ..., $N_{PT-RS}$, k=0 or 1, and the subscripts 0, ..., R/2 of m, g and k indicate that the corresponding parameters m, g and k are for corresponding layers 0, ..., R/2, and $(X)_g$ means that a vector X is rotated right by g elements.

Example 41 includes the method of any of examples 29-40, wherein the codebook is capable of supporting antenna combining and antenna selection, and is denoted as:

W=W₁W₂ wherein $W_1$ is used for selecting antenna ports, and $W_2$ is used for indicating co-phasing between the selected antenna ports.

Example 42 includes the method of example 41, wherein for wideband precoding, the precoder is indicated by a transmission precoder matrix indicator (TPMI) based on W; and for subband precoding, the precoder is indicated by a first TPMI based on $W_1$ and a second TPMI based on $W_2$, and wherein the first TPMI is used to indicate a wideband antenna port selection and the second TPMI is used to indicate antenna co-phasing for each subband.

Example 43 includes a method for controlling physical uplink shared channel (PUSCH) transmission performed by a next generation node B (gNodeB), comprising: decoding a UE capability of a user equipment (UE) reported by the UE, wherein the UE capability comprises a number of phase tracking reference signal (PT-RS) antenna ports ($N_{PT-RS}$) supported by the UE; selecting a precoder from a codebook, based on at least the $N_{PT-RS}$; and transmitting, to the UE, control signaling to control the PUSCH transmission of the UE, wherein the control signaling comprises at least one parameter to indicate the selected precoder; wherein the codebook is predefined or configured based on different numbers of PT-RS antenna ports and different waveforms, in the gNodeB and the UE.

Example 44 includes the method of example 43, wherein the selected precoder indicates a number of PT-RS antenna ports to be used by the UE for the PUSCH transmission.

Example 45 includes the method of examples 43 or 44, wherein the control signaling comprises an uplink (UL) grant and/or Radio Resource Control (RRC) signaling.

Example 46 includes the method of any of claims 43-45, wherein the method further comprises: transmitting the control signaling in downlink control information (DCI), and indicating the selected precoder via a transmission precoder matrix indicator (TPMI) and a transmission rank indicator (TRI) included in the DCI.

Example 47 includes the method of any of claims 43-46, wherein the method further comprises: transmitting, to the UE, a waveform configuration for the UE, in the control signaling; or indicating the waveform configuration by the selected precoder; wherein the waveform configuration is one of a cyclic prefix-orthogonal frequency division multiplexing (CP-OFDM) waveform and a Discrete Fourier Transform-spread-OFDM (DFT-s-OFDM) waveform.

Example 48 includes the method of any of claims 43-47, wherein the predefined or configured codebook in the gNodeB and the UE is divided into a plurality of codebook subsets based on different numbers of PT-RS antenna ports and/or different waveforms.

Example 49 includes the method of claim 48, wherein the method further comprises: selecting a codebook subset within the codebook based on the $N_{PT-RS}$ and/or waveform configuration for the UE; transmitting, to the UE, an indication of the codebook subset; and selecting the precoder from the codebook subset; wherein the waveform configuration is one of a cyclic prefix-orthogonal frequency division multiplexing (CP-OFDM) waveform and a Discrete Fourier Transform-spread-OFDM (DFT-s-OFDM) waveform.

Example 50 includes the method of claim 49, wherein the method further comprises: transmitting, the waveform configuration, together with the indication of the codebook subset, to the UE; or indicate the waveform configuration by the codebook subset.

Example 51 includes the method of any of claims 43-50, wherein the UE capability further comprises a number of Sounding reference signal (SRS) antenna ports ($N_{SRS}$), or a number of SRS antenna ports per PT-RS antenna port.

Example 52 includes the method of example 51, wherein the codebook comprises a rank 1 codebook, which is denoted as:

$$w_{m,n,g,k}^{(1)} = \frac{1}{\sqrt{N}} [v_{m,g,k} \; \varphi_n v_{m,g,k}]^T$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and wherein $$\varphi_n = e^{j\pi n/2}, \; v_{m,g,k} = \left(\left[1 \; e^{\frac{j2\pi m}{N_{Tx}}} \; e^{\frac{j4\pi m}{N_{Tx}}} \; \ldots \; e^{\frac{j2\pi m(\lfloor N/2 \rfloor + k)}{N_{Tx}}} \; 0 \ldots 0\right]\right)_g,$$

m is an antenna combining offset, n is an antenna co-phasing phase offset, g is a number of selected antenna ports, g=aN, a=0,1, ..., $N_{PT-RS}$, k=0 or 1, and $(X)_g$ means that a vector X is rotated right by g elements.

Example 53 includes the method of example 51, wherein the codebook comprises a rank 2 codebook, which is denoted as:

$$w_{m,n,g,k}^{(2)} = \frac{1}{\sqrt{2N}} \begin{bmatrix} v_{m,g,k} & v_{m',g',k'} \\ \varphi_n v_{m,g,k} & -\varphi_n v_{m',g',k'} \end{bmatrix}$$

wherein $$N = \left\lfloor \frac{N_{Tx}}{N_{PT-RS}} \right\rfloor$$

represents a number of transmission antenna ports per PT-RS antenna port, $N_{Tx}$ means a number of transmission antenna ports and is determined based on the $N_{SRS}$; and Wherein $$\varphi_n = e^{j\pi n/2}, \; v_{m,g,k} = \left(\left[1 \; e^{\frac{j2\pi m}{N_{Tx}}} \; e^{\frac{j4\pi m}{N_{Tx}}} \; \ldots \; e^{\frac{j2\pi m(\lfloor N/2 \rfloor + k)}{N_{Tx}}} \; 0 \ldots 0\right]\right)_g, \; v_{m',g',k'} =$$

$$\left(\left[1 \; e^{\frac{j2\pi m'}{N_{Tx}}} \; e^{\frac{j4\pi m'}{N_{Tx}}} \; \ldots \; e^{\frac{j2\pi m'(\lfloor N/2 \rfloor + k')}{N_{Tx}}} \; 0 \ldots 0\right]\right)_g,$$

m is an antenna combining offset for a first layer, n is an antenna co-phasing phase offset, g is a number of selected antenna ports for the first layer, g=aN, a=0,1, ..., $N_{PT-RS}$, k=0 or 1, m' is an antenna combining offset for a second layer, g' is a number of selected antenna ports for the second layer, g'=a'N, a'=0,1, ..., $N_{PT-RS}$, k'=0 or 1, and $(X)_g$ means that a vector X is rotated right by g elements.

Example 54 includes the method of example 51, wherein the codebook comprises a high rank codebook, wherein the high rank is represented by R which is an integer larger than 2, and the high rank codebook is denoted as:

$$w_{m,n,g,k}^{(R)} = \frac{1}{\sqrt{RN}} \begin{bmatrix} v_{m_0,g_0,k_0} & \cdots & v_{m_{R/2},g_{R/2},k_{R/2}} & v_{m_0,g_0,k_0} & \cdots & v_{m_{R/2},g_{R/2},k_{R/2}} \\ \varphi_n v_{m_0,g_0,k_0} & \cdots & \varphi_n v_{m_{R/2},g_{R/2},k_{R/2}} & -\varphi_n v_{m_0,g_0,k_0} & \cdots & -\varphi_n v_{m_{R/2},g_{R/2},k_{R/2}} \end{bmatrix}$$

$$N = \left\lfloor \frac{N_{Tx}}{N_{PT-RS}} \right\rfloor$$

wherein represents a number of transmission antenna ports per PT-RS antenna port, $N_{Tx}$ means a number of transmission antenna ports and is determined based on the $N_{SRS}$; and Wherein $$\varphi_n = e^{j\pi n/2}, \; v_{m_0,g_0,k_0} =$$

$$\left(\left[1 \; e^{\frac{j2\pi m_0}{N_{Tx}}} \; e^{\frac{j4\pi m_0}{N_{Tx}}} \; \ldots \; e^{\frac{j2\pi m_0(\lfloor N/2 \rfloor + k_0)}{N_{Tx}}} \; 0 \ldots 0\right]\right)_{g_0}, \; v_{m_{R/2},g_{R/2},k_{R/2}} =$$

$$\left(\left[1 \; e^{\frac{j2\pi m_{R/2}}{N_{Tx}}} \; e^{\frac{j4\pi m_{R/2}}{N_{Tx}}} \; \ldots \; e^{\frac{j2\pi m_{R/2}(\lfloor N/2 \rfloor + k_{R/2})}{N_{Tx}}} \; 0 \ldots 0\right]\right)_{g_{R/2}},$$

m is an antenna combining offset, n is an antenna co-phasing phase offset, g is a number of selected antenna ports, g=aN, a=0,1, ..., $N_{PT-RS}$, k=0 or 1, and the subscripts 0, ..., R/2 of m, g and k indicate that the corresponding parameters m, g and k are for corresponding layers 0, ..., R/2, and $(X)_g$ means that a vector X is rotated right by g elements.

Example 55 includes the method of any of examples 43-54, wherein the codebook is capable of supporting antenna combining and antenna selection, and is denoted as:

$$W = W_1 W_2$$

wherein $W_1$ is used for selecting antenna ports, and $W_2$ is used for indicating co-phasing between the selected antenna ports.

Example 56 includes the method of example 55, wherein for wideband precoding, the precoder is indicated by a transmission precoder matrix indicator (TPMI) based on W; and for subband precoding, the precoder is indicated by a first TPMI based on $W_1$ and a second TPMI based on $W_2$, and wherein the first TPMI is used to indicate a wideband antenna port selection and the second TPMI is used to indicate antenna co-phasing for each subband.

Example 57 includes a computer-readable storage medium having instructions stored thereon, which when executed by one or more processors of a user equipment (UE), cause the UE to perform a method according to any of examples 29-42.

Example 58 includes an apparatus to be employed in a user equipment (UE), comprising means for performing a method according to any of examples 29-42.

Example 59 includes a computer-readable storage medium having instructions stored thereon, which when executed by one or more processors of a next generation node B (gNodeB), cause the gNodeB to perform a method according to any of examples 43-56.

Example 60 includes an apparatus to be employed in a next generation node B (gNodeB), comprising means for performing a method according to any of examples 43-56.

Example 61 includes a system, comprising a user equipment (UE) according to any of examples 1-14 and a base station according to any of examples 15-29.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A method performed by a user equipment (UE), comprising:
   reporting, to a base station, a UE capability comprising a number of phase tracking reference signal (PT-RS) antenna ports supported by the UE;
   receiving, from the base station, control signaling comprising an uplink (UL) grant for transmitting data to the base station using a Physical Uplink Shared Channel (PUSCH), wherein the control signaling further comprises a transmission precoder matrix indicator (TPMI) indicating a correspondence between the PT-RS antenna ports and the PUSCH antenna ports;
   determining one or more PUSCH antenna ports on which to transmit the data; and
   transmitting, using the one or more PUSCH antenna ports, the data to the base station.

2. The method of claim 1, wherein the control signaling comprises downlink control information (DCI).

3. The method of claim 1, wherein the control signaling comprises radio resource control (RRC) signaling.

4. The method of claim 1, further comprising:
   selecting a precoder from a codebook based on the PT-RS antenna ports, wherein the codebook is predefined.

5. The method of claim 4, wherein the codebook is based on a number of the PT-RS antenna ports and a waveform.

6. The method of claim 5, wherein the waveform is one of a cyclic prefix-orthogonal frequency division multiplexing (CP-OFDM) waveform or a Discrete Fourier Transform-spread-OFDM (DFT-s-OFDM).

7. An apparatus of a user equipment (UE), comprising processing circuitry configured to:
   configure radio frequency (RF) circuitry to transmit, to a base station, a UE capability comprising a number of phase tracking reference signal (PT-RS) antenna ports supported by the UE;
   decode, based on signals received from the base station, control signaling comprising an uplink (UL) grant for transmitting data to the base station using a Physical Uplink Shared Channel (PUSCH), wherein the control signaling further comprises a transmission precoder matrix indicator (TPMI) indicating a correspondence between the PT-RS antenna ports and the PUSCH antenna ports;
   determine one or more PUSCH antenna ports on which to transmit the data; and
   configure RF circuitry to transmit, using the one or more PUSCH antenna ports, the data to the base station.

8. The apparatus of claim 7, wherein the control signaling comprises downlink control information (DCI).

9. The apparatus of claim 7, wherein the control signaling comprises radio resource control (RRC) signaling.

10. The apparatus of claim 7, further comprising:
    selecting a precoder from a codebook based on the PT-RS antenna ports, wherein the codebook is predefined.

11. The apparatus of claim 10, wherein the codebook is based on a number of the PT-RS antenna ports and a waveform.

12. The apparatus of claim 11, wherein the waveform is one of a cyclic prefix-orthogonal frequency division multiplexing (CP-OFDM) waveform or a Discrete Fourier Transform-spread-OFDM (DFT-s-OFDM).

13. A processor configured to:
    report, to a base station, a UE capability comprising a number of phase tracking reference signal (PT-RS) antenna ports supported by the UE;
    receive, from the base station, control signaling comprising an uplink (UL) grant for transmitting data to the base station using a Physical Uplink Shared Channel (PUSCH), wherein the control signaling further comprises a transmission precoder matrix indicator (TPMI) indicating a correspondence between the PT-RS antenna ports and the PUSCH antenna ports;
    determine one or more PUSCH antenna ports on which to transmit the data; and
    transmit, using the one or more PUSCH antenna ports, the data to the base station.

14. The processor of claim 13, wherein the control signaling comprises downlink control information (DCI).

15. The processor of claim 13, wherein the control signaling comprises radio resource control (RRC) signaling.

16. The processor of claim 13, further comprising:
    selecting a precoder from a codebook based on the PT-RS antenna ports, wherein the codebook is predefined.

17. The processor of claim 16, wherein the codebook is based on a number of the PT-RS antenna ports and a waveform.

18. The processor of claim 17, wherein the waveform is one of a cyclic prefix-orthogonal frequency division multiplexing (CP-OFDM) waveform or a Discrete Fourier Transform-spread-OFDM (DFT-s-OFDM).

* * * * *